(12) United States Patent
Saito et al.

(10) Patent No.: US 8,741,049 B2
(45) Date of Patent: Jun. 3, 2014

(54) INK COMPOSITION, INK SET, AND IMAGE FORMING METHOD

(75) Inventors: Ryo Saito, Kanagawa (JP); Makoto Ohmoto, Kanagawa (JP); Atsushi Inagaki, Kanagawa (JP); Akimitsu Haishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/481,970

(22) Filed: May 29, 2012

(65) Prior Publication Data
US 2012/0320124 A1   Dec. 20, 2012

(30) Foreign Application Priority Data

Jun. 17, 2011   (JP) .................................. 2011-135772
Aug. 26, 2011   (JP) .................................. 2011-185215

(51) Int. Cl.
*C09D 11/02*   (2006.01)

(52) U.S. Cl.
USPC ...................................... 106/31.89; 106/31.6

(58) Field of Classification Search
USPC ........................................... 106/31.89, 31.61
See application file for complete search history.

(56) References Cited

U.S. PATENT DOCUMENTS

| | | | |
|---|---|---|---|
| 5,580,372 A | 12/1996 | Gino et al. | |
| 5,879,439 A | 3/1999 | Nagai et al. | |
| 6,153,001 A * | 11/2000 | Suzuki et al. | 106/31.65 |
| 6,802,893 B1 * | 10/2004 | Komatsu et al. | 106/31.6 |
| 2006/0047013 A1 * | 3/2006 | Ito et al. | 523/160 |
| 2007/0120928 A1 | 5/2007 | Ma et al. | |
| 2008/0317958 A1 * | 12/2008 | Bhatt et al. | 427/258 |
| 2009/0235842 A1 * | 9/2009 | Ikoshi et al. | 106/31.6 |
| 2009/0297712 A1 | 12/2009 | Kasahara et al. | |
| 2010/0041816 A1 | 2/2010 | Ikoshi et al. | |
| 2010/0165020 A1 | 7/2010 | Tojo et al. | |

FOREIGN PATENT DOCUMENTS

| | | |
|---|---|---|
| EP | 1908806 A | 4/2008 |
| JP | H04-356570 | 12/1992 |
| JP | H08-41392 | 2/1996 |
| JP | 10140065 A | 5/1998 |
| JP | 2001-240779 | 9/2001 |
| JP | 2003-055590 | 2/2003 |
| JP | 2010-065205 | 3/2010 |
| JP | 2010-155928 | 7/2010 |
| JP | 2010-222418 A | 10/2010 |
| JP | 4625133 B | 2/2011 |

OTHER PUBLICATIONS

Extended European Search Report (EESR) dated Oct. 1, 2012 from the EPO in an European patent application corresponding to the instant patent application. This EESR is submitted now in order to supplement the understanding of patent documents US2007/120928, US5879439, EP1908806 (US2009/297712) and JP10-140065 which are cited in the EESR and is being disclosed in the instant Information Disclosure Statement.

(Continued)

*Primary Examiner* — Veronica F Faison
(74) *Attorney, Agent, or Firm* — Solaris Intellectual Property Group, PLLC

(57) ABSTRACT

An ink composition is disclosed which includes a pigment, self-dispersing resin particles including a hydrophilic constituent unit and a hydrophobic constituent unit, at least two nonionic surfactants including (a) a nonionic surfactant having an HLB of from 15 to 19 and (b) a nonionic surfactant having an HLB of from 10 to less than 15, a water-soluble organic solvent, and water. An ink set and an image forming method are also disclosed.

19 Claims, 1 Drawing Sheet

(56) References Cited

OTHER PUBLICATIONS

English language translation of the following: Office action dated Sep. 3, 2013 from the JPO in a Japanese patent application corresponding to the instant patent application. This office action translation is submitted now in order to supplement the understanding of patent documents JP2001-240779, JPH08-041392, JP2003-055590, JPH04-356570, JP2010-065205 and JP2010-155928 which are cited in the office action and are being disclosed in the instant Information Disclosure Statement.

* cited by examiner

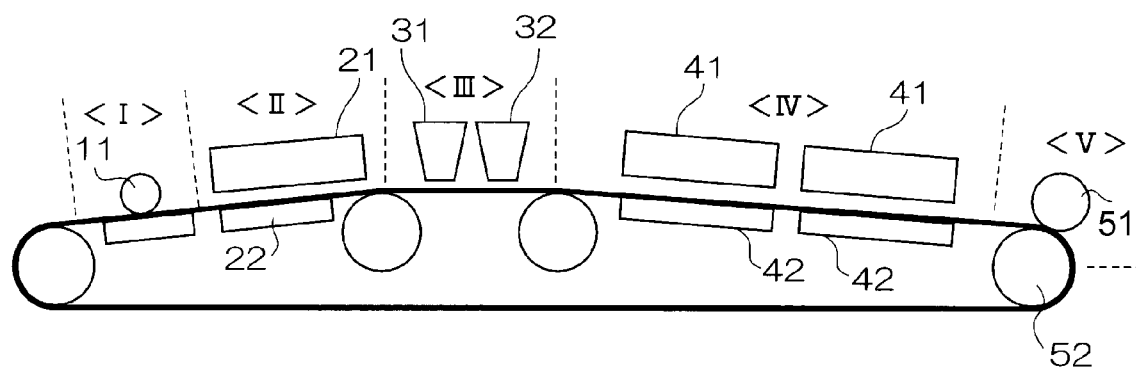

INK COMPOSITION, INK SET, AND IMAGE FORMING METHOD

CROSS-REFERENCE TO RELATED APPLICATION

This application is based on and claims priority under 35 USC 119 from Japanese Patent Application No. 2011-135772 filed on Jun. 17, 2011, and Japanese Patent Application No. 2011-185125 filed on Aug. 26, 2011, the disclosures of which are incorporated herein by reference.

BACKGROUND OF THE INVENTION

1. Technical Field

The present invention relates to an aqueous ink composition, an ink set, and an image forming method.

2. Description of the Related Art

Since image forming methods using an ink-jet method allow, for example, recording of high-quality images on various kinds of recording media by ejecting droplets of inks from nozzles provided at an ink-jet head, such image forming methods are expected to be applied to a wide range of fields.

In the case of forming an image, besides qualities such as the resolution or color tone of the formed image, image density and texture, in terms of image qualities, it is required that unevenness such as streak-like unevenness or regions missing color do not occur in the image and that the image itself is strong against abrasion. Further, in order to realize the high quality that is required as an image, it is also important that the ejection property is satisfactory in the case of ejecting inks from the ejection head.

For example, froth the viewpoint of improving the strength of the formed image or the like, there are cases in which a resin component is present in the ink. In such cases, after ejecting the ink and forming an image, by subjecting the image to a heat treatment, the resin component in the image is softened and forms a film, whereby fixation is conducted, and thus, resistance to external forces such as abrasion can be imparted.

In connection with the technique of using a resin composition, for example, an aqueous ink composition for ink-jet recording containing self-dispersing resin particles together with a pigment, a solvent, and the like has been disclosed (see, for example, Japanese Patent No. 4625133), and it is said that such an ink composition is effective in reducing image blocking and offset at the time of fixation.

Further, as an aqueous ink composition having excellent ejection stability, a composition including a dispersion containing a pigment that is included in a dispersion polymer such that the pigment can be dispersed in water, a wetting agent, and water has been disclosed, and it is described that the composition includes, as the wetting agent, an acetylene glycol surfactant or an acetylene alcohol surfactant, in order to maintain adequate surface tension or adequate interface tension to the head nozzle (see, for example, Japanese Patent Application Laid-Open (JP-A) No. 2010-222418).

SUMMARY OF THE INVENTION

However, in an ink composition in which a particulate resin component is made to be contained in the ink using latex or the like, there is a tendency for dot diameters of ink droplets, which have been ejected from nozzles and spotted on a recording medium, to fluctuate and be unstable in a case in which heat has been applied to the ink during storage or the like due to a high environmental temperature or the like. Namely, the dot diameters of ink droplets that have been spotted on a recording medium tend to be smaller and, for example, in the case of forming an image by overlaying plural ink droplets, the diameter of an ink liquid droplet that is placed on a liquid droplet that has already been spotted tends to be smaller. This phenomenon may bring about reduction in dot density and may cause defects such as streaks or unevenness in the image or change in the color reproduction region, resulting in exerting influence on image qualities such as granularity or color tone of the image.

Further, in an image recording method using an ink-jet method, in a case in which the recording media which have been subjected to image formation are stacked, a phenomenon (blocking) may occur in which the recording media stick to each other and inks at the image portion adhere to the backside of the recording media. Furthermore, in a case in which a fixation treatment using a fixing roller or the like is carried out for the purpose of improving the scratch resistance of the image or the like, a phenomenon (which is referred to as "offset") in which the image portion on the recording medium transfers to the fixing roller or the like may occur.

The present invention has been made in view of the above, and it is an object of the invention to provide an ink composition which has favorable ink ejection property and with which the reduction in diameter of liquid droplet diameter (dot diameter) of spotted ink can be suppressed and excellent image quality and color reproducibility can be realized, an ink set, and an image forming method.

It should be noted that, in the image quality described above, reduction in the number of defects such as streak-like defects or defects of regions missing color, due to the reduction in dot diameter, is included.

The present invention provides an ink composition, an ink set, and an image forming method.

A first aspect of the present invention provides an ink composition which includes a pigment, self-dispersing resin particles including a hydrophilic constituent unit and a hydrophobic constituent unit, at least two nonionic surfactants including (a) a nonionic surfactant having an HLB of from 15 to 19 and (b) a nonionic surfactant having an HLB of from 10 to less than 15, a water-soluble organic solvent, and water.

A second aspect of the present invention provides an ink set which includes the ink composition according to the first aspect; and a treatment liquid including an aggregating component that causes formation of an aggregate in the ink composition as a result of contacting the ink composition.

A third aspect of the present invention provides an image forming method which includes applying an ink composition onto a recording medium by ejecting the ink composition according to the first aspect, or the ink composition included in the ink set according to the second aspect, from an ejection head having a plurality of nozzle holes that discharge liquid droplets, by an ink jet method.

BRIEF DESCRIPTION OF THE DRAWINGS

FIG. 1 is a schematic view showing an example of a structure of an ink-jet recording apparatus used for carrying out the image forming method of the present invention.

DETAILED DESCRIPTION OF THE INVENTION

Hereinbelow, an ink composition of the present invention, and an ink set and image forming method using the same are described in detail.

<Ink Composition>

The ink composition of the present invention includes a pigment; self-dispersing resin particles including a hydrophilic constituent unit and a hydrophobic constituent unit; at least two nonionic surfactants including (a) a nonionic surfactant having an HLB of from 15 to 19 and (b) a nonionic surfactant having an HLB of from 10 to less than 15; a water-soluble organic solvent; and water. The ink composition of the present invention may further include one or more other components such as a dispersant for pigment, wax, or a wetting agent, as necessary.

In a case where, in the preparation of an aqueous ink which includes a pigment as a colorant, and, from the viewpoint of enhancing the scratch resistance of the formed image, also includes resin particles such as latex as a resin component, which is conventionally used, for example, during storage or the like, the ink is exposed to a high temperature environment higher than ordinary temperature and heat is applied, it was found that the liquid droplet diameter (dot diameter) of the ink which is used and is spotted on the recording medium after the heat has been applied tends to be smaller. In a case where the dot diameter is reduced, even if plural liquid droplets are spotted to provide a overlapping region, a space is formed between the liquid droplets and, as a result, there are influences such that image defects such as regions missing color (for example, white spots) or streaks occur or the color hue of the image or color reproduction region changes.

Especially, in the case of forming an image by spotting a second ink, which has a hue different from that of the first ink, on an image formed by spotting the first ink (in the case of forming a secondary color image), it was found that the above phenomenon is remarkable and therefore, the hue of the image may change or the color reproduction region may be reduced.

The reason for the phenomenon of the reduced dot diameter, as described above, is guessed as follows. Namely, it is because the surface tension of the ink has changed during the storage under a high temperature environment higher than ordinary temperature as described above, and in addition, it is because the surface state of the resin particles in the ink and the film forming state when the image is formed have changed. Therefore, for example, in a system in which a nonionic surfactant is incorporated in the ink, it is thought that this surfactant may adsorb onto the surface of the resin particles to change the surface state of the resin particles due to the adsorption of the surfactant as well as to increase the surface tension of the ink.

In the present invention, in order to prevent the reduction (that is, reduction in diameter) in dot diameter on the recording medium, of the ink composition containing resin particles, without damaging the ejection property, the ink composition includes two or more nonionic surfactants having different HLB values from each other. Namely, in order to prevent the reduction in dot diameter, a nonionic surfactant having a high hydrophilicity (having a large HLB value) is used, and further, in order to prevent the reduction in dot diameter and also to maintain the dynamic surface tension of the ink at a low level, in addition to the above-described surfactant having a high hydrophilicity, with which the dynamic surface tension of the ink is relatively less likely to be reduced, a hydrophobic nonionic surfactant (having a small HLB value) is used in combination. Specifically, in an embodiment, in the presence of resin particles and an organic solvent, a nonionic surfactant with 15≤HLB≤19 and a nonionic surfactant with 10≤HLB≤15 are used in combination.

With the ink composition having the above configuration, while maintaining a favorable ink ejection property, as compared with conventional inks containing resin particles, the reduction in liquid droplet diameter (dot diameter) of the spotted ink can be suppressed. As a result, the image defects such as streak defects or defects of regions missing color may be further reduced, and an image which has excellent image quality and excellent color reproducibility with few changes in hue of a multicolor image and stably maintained color reproduction region may be formed.

Hereinbelow, components which may be included in the ink composition of the present invention are described in detail.

Pigment

The present invention includes at least one kind of pigment as a colorant. The pigment may be selected as appropriate according to the purpose. Any of organic pigments and inorganic pigments may be used.

Examples of the organic pigments include azo pigments, polycyclic pigments, dye chelates, nitro pigments, nitroso pigments, and aniline black. Among them, azo pigments and polycyclic pigments, and the like are more preferred. Examples of the azo pigments include azo lakes, insoluble azo pigments, condensed azo pigments, and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments. Examples of the dye chelates include basic dye type chelates and acidic dye type chelates. Examples of the inorganic pigments include titanium oxide, iron oxide, calcium carbonate, barium sulfate, aluminum hydroxide, barium yellow, cadmium red, chrome yellow, and carbon black. Among them, carbon black is particularly preferred. Examples of carbon black include those produced according to any of known methods such as a contact method, a furnace method, or a thermal method. Among these pigments, a water-dispersible pigment is preferable.

Specific examples of the water-dispersible pigment may include the following pigments of (1) to (5).

(1) An encapsulated pigment, that is, a polymer dispersion in which a pigment is incorporated in polymer particles. More specifically, the encapsulated pigment is a pigment coated with a hydrophilic and water-insoluble resin and has hydrophilicity due to the resin layer provided on the surface of the pigment, and therefore, the encapsulated pigment is dispersible in water.

(2) A self-dispersing pigment, that is, a pigment which has at least one kind of hydrophilic group at the surface, and exhibits at least any of water-solubility or water-dispersibility in the absence of a dispersant. More specifically, the self-dispersing pigment is a pigment produced mainly by subjecting carbon black or the like to a surface oxidation treatment to render the pigment hydrophilic, and thus making the pigment per se to disperse in water.

(3) A resin-dispersed pigment, that is, a pigment dispersed by a water-soluble polymer compound having a weight average molecular weight of 50,000 or less.

(4) A surfactant-dispersed pigment, that is, a pigment dispersed by a surfactant.

(5) A crosslinked polymer-encapsulated pigment, that is, a pigment which is produced by dispersing a pigment using a water-soluble or water-insoluble dispersant and thereafter crosslinking the dispersant using a crosslinking agent to water-insolubilize the water-soluble dispersant.

Among these pigments, preferred are the (1) encapsulated pigment, the (2) self-dispersing pigment and the (5) crosslinked polymer-encapsulated pigment, and particularly preferred are the (1) encapsulated pigment and the (5) crosslinked polymer-encapsulated pigment from the viewpoints of ink storage stability over a long-term and ink ejection stability after storage under a high temperature environment.

Here, the (1) encapsulated pigment is described in detail.

The resin for the encapsulated pigment is not limited, but the resin is preferably a polymer compound having self-dispersing ability or dissolving ability in a mixed solvent of water and a water-soluble organic solvent, and having an anionic group (acidic). Usually, this resin preferably has a number average molecular weight in a range of from about 1,000 to about 100,000, and particularly preferably in a range of from about 3,000 to about 50,000. It is also preferable that this resin is dissolved in an organic solvent to form a solution. When the number average molecular weight of the resin is within this range, the resin may exhibit its function as a coating layer for the pigment, or as a coating layer when used in an ink. The resin is preferably used in the form of a salt of an alkali metal or an organic amine.

Specific examples of the resin for the encapsulated pigment include materials having an anionic group, such as thermoplastic, thermosetting or modified acrylic, epoxy-based, polyurethane-based, polyether-based, polyamide-based, unsaturated polyester-based, phenolic, silicone-based, or fluorine-based resins; polyvinyl-based resins such as vinyl chloride, vinyl acetate, polyvinyl alcohol, or polyvinyl butyral; polyester-based resins such as alkyd resins and phthalic acid resins; amino-based materials such as melamine resins, melamine-formaldehyde resins, aminoalkyd co-condensation resins and urea resins; and copolymers or mixtures thereof.

Among these resins, the anionic acrylic resins may be obtained by, for example, polymerizing an acrylic monomer having an anionic group (hereinbelow, referred to as "anionic group-containing acrylic monomer") and if necessary, another monomer capable of being copolymerized with the anionic group-containing acrylic monomer, in a solvent. Examples of the anionic group-containing acrylic monomer include acrylic monomers having one or more anionic groups selected from the group consisting of a carboxyl group, a sulfonic acid group, and a phosphonic acid group, and among them, acrylic monomers having a carboxyl group are particularly preferred. Specific examples of the acrylic monomer having a carboxyl group include acrylic acid, methacrylic acid, crotonic acid, ethacrylic acid, propylacrylic acid, isopropylacrylic acid, itaconic acid, and fumaric acid. Among them, acrylic acid or methacrylic acid is preferred.

The encapsulated pigment may be produced by a conventional physical or chemical method, using the above-described components. For example, the encapsulated pigment may be produced by the method described in JP-A Nos. 9-151342, 10-140065, 11-209672, 11-172180, 10-25440, or 11-43636. Specific examples of the method include the phase inversion emulsification method and acid precipitation method described in JP-A Nos. 9-151342 and 10-140065, respectively, and among them, the phase inversion emulsification method is preferred in view of dispersion stability. The phase inversion emulsification method is described below.

The self-dispersing pigment is also one of preferred examples. The self-dispersing pigment is a pigment which has a large number of hydrophilic functional groups and/or salts thereof (hereinafter, referred to as "dispersibility imparting group") bonded to the pigment surface directly or indirectly via an alkyl group, an alkyl ether group, an aryl group or the like, and is capable of dispersing in an aqueous medium without using a dispersant for pigment dispersion. Here, the term "dispersing in an aqueous medium without using a dispersant" implies that the pigment is capable of being dispersed in an aqueous medium even though a dispersant for dispersing pigments is not used.

Since an ink containing a self-dispersing pigment as the colorant does not need to include a dispersant which is usually incorporated to disperse pigments, it is easy to prepare an ink in which foaming due to decrease in the antifoaming property caused by the dispersant scarcely occurs, and which has excellent ejection stability. Examples of the dispersibility imparting group that is bonded to the surface of the self-dispersing pigment include —COOH, —CO, —OH, —$SO_3H$, —$PO_3H_2$, quaternary ammonium, and salts thereof. The dispersibility imparting group may be bonded to the surface of the pigment by applying a physical treatment or a chemical treatment to the pigment, thereby bonding (grafting) the dispersibility imparting group or an active species having a dispersibility imparting group to the pigment surface. Examples of the physical treatment may include vacuum plasma treatment. Examples of the chemical treatment may include a wet oxidation method of oxidizing the pigment surface in water by an oxidizing agent; and a method of bonding a carboxyl group via a phenyl group by bonding p-aminobenzoic acid to the pigment surface.

The self-dispersing pigment in the invention may be, for example, a self-dispersing pigment which is surface treated by an oxidation treatment using hypohalous acid and/or hypohalite, or an oxidation treatment using ozone. As the self-dispersing pigment, a commercially available product may be used, and specific examples of the commercially available self-dispersing pigment include MICROJET CW-1 (trade name; manufactured by Orient Chemical Industries, Ltd.), and CAB-O-JET200 and CAB-O-JET300 (all trade names; manufactured by Cabot Corp.).

As the pigment, an encapsulated pigment in which, among pigment dispersants, a water-insoluble resin is used and the surface of a pigment is at least partially coated with the water-insoluble resin, e.g., a polymer emulsion in which a pigment is contained in water-insoluble resin particles, is preferable. Specifically, a water dispersible pigment in which a pigment is at least partially coated with a water-insoluble resin, and which has a resin layer formed on the surface of the pigment, and can disperse in water is preferable. Using such an encapsulated pigment coated with a water-insoluble resin is preferable from the viewpoint of aggregating properties, and is also preferable since a high resolution image may be formed in a case in which high speed recording is employed.

Here, the phase inversion emulsification method is described.

Basically, the phase inversion emulsification method is a self-dispersing (phase inversion emulsification) method in which a mixed molten product of a pigment and a resin having a self-dispersing ability or dissolving ability is dispersed in water. This mixed molten product may include a curing agent or a polymer compound. Here, the mixed molten product may be a state in which ingredients are mixed but are not dissolved, a state in which ingredients are dissolved and mixed, or a state in which these two states are included. Specific examples of a production method of the "phase inversion emulsification method" include a method described in JP-A No. 10-140065.

Specific examples of the phase inversion emulsification method and the acid precipitation method may be referred in the description of each of JP-A Nos. 9-151342 and 10-140065.

—Pigment Dispersant—

Pigment dispersants can be used for easily dispersing the pigment when the pigment is dispersed and for stabilizing dispersion status after the pigment is dispersed. Examples of the pigment dispersants include nonionic compounds, anionic compounds, cationic compounds, and amphoteric compounds. Examples of the pigment dispersant include copolymers obtained by using monomers having an α,β-ethylenically unsaturated group. Examples of the monomers having an α,β-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinylsulfonic acid, styrenesulfonic acid, sulfonated vinylnaphthalene, vinyl alcohol, acrylamide, methacryloyloxy ethyl phosphate, bis(methacryloyloxy ethyl) phosphate, methacryloyloxy ethyl phenyl acid phosphate, ethylene glycol dimethacrylate, diethylene glycol dimethacrylate, styrene derivatives such as styrene, α-methylstyrene, or vinyltoluene, vinylcyclohexane, vinylnaphthalene, vinylnaphthalene derivatives, acrylic acid alkyl esters which may be substituted by an aromatic group, acrylic acid phenyl ester, methacrylic acid alkyl esters which may be substituted by an aromatic group, methacrylic acid phenyl ester, methacrylic acid cycloalkyl ester, crotonic acid alkyl ester, itaconic acid dialkyl ester, maleic acid dialkyl ester, and derivatives of the compounds described above.

A homopolymer obtained by polymerizing one kind of monomer having an α,β-ethylenically unsaturated group or a copolymer obtained by copolymerizing plural kinds of monomers having an α,β-ethylenically unsaturated group can be used as a polymeric dispersant. Specific examples thereof include an alkyl acrylate-acrylic acid copolymer, an alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, polystyrene, polyester, and polyvinyl alcohol.

The pigment dispersant preferably has a weight average molecular weight of from 2,000 to 60,000.

The addition amount of the pigment dispersant is preferably in a range of from 10% to 100%, more preferably from 20% to 70%, and even more preferably from 40% to 50% based on mass, relative to the pigment.

One kind of pigment may be used alone, or plural kinds of pigments selected from any one or more of the groups described above may be used in combination.

The content of the pigment(s) in the ink composition is preferably from 0.1% by mass to 15% by mass, more preferably from 0.5% by mass to 12% by mass, and particularly preferably from 1% by mass to 10% by mass, relative to the total mass of the ink, from the viewpoints of color density, granularity, ink stability, and ejection reliability.

It is preferable that the method for obtaining a crosslinked polymer-encapsulated pigment is a method in which a pigment is dispersed using a water-soluble or water-insoluble dispersant and thereafter the dispersant is crosslinked using a crosslinking agent to water-insolubilize the water-soluble dispersant, thereby preparing a pigment dispersion.

Examples of the dispersant include polyvinyls, polyurethanes, and polyesters. Among them, polyvinyls are preferable.

The dispersant may have a functional group capable of being crosslinked by a crosslinking agent in the molecule. The functional group capable of being crosslinked is not particularly limited, and examples thereof include a carboxyl group or a salt thereof, an isocyanato group, and an epoxy group. It is preferable that the dispersant has a carboxyl group or a salt thereof from the viewpoint of improvement in dispersibility.

The crosslinking agent is not particularly limited as long as the crosslinking agent has two or more moieties that react with the dispersant. In particular, a compound having two or more epoxy groups (an epoxy compound having a functionality of two or more) is preferable in view of having excellent reactivity with carboxyl groups.

Self-Dispersing Resin Particles

The present invention includes at least one kind of self-dispersing resin particles (hereinbelow, may be referred to merely as "resin particles") including a hydrophilic constituent unit and a hydrophobic constituent unit.

It is preferable that the resin particles have a function of fixing the ink composition, i.e., an image, by aggregating or destabilizing dispersion when contacted with a treatment liquid described below or a paper area on which the treatment liquid is dried, to thereby increase the viscosity of ink. Such resin particles are preferably dispersed in at least one of water and an organic solvent.

In the present invention, the glass transition temperature of the self-dispersing resin particles is preferably 80° C. or higher. The fact that the Tg is 80° C. or higher indicates that the resin is hydrophobic. When the ink composition contains resin particles having a Tg of 80° C. or higher, the fixability of the ink composition to a recording medium and scratch resistance can be further improved, and the blocking resistance and offset resistance of the image can also be further improved.

The glass transition temperature of the resin particles is more preferably from 100° C. to 300° C., more preferably from 130° C. to 250° C., and more preferably from 160° C. to 200° C. When the glass transition temperature of the resin particles to be contained is 300° C. or lower, the scratch resistance of images to be recorded may be more effectively improved.

The glass transition temperature of resin particles (polymer particles) can be controlled as appropriate by generally-used methods. For example, the glass transition temperature of resin particles can be controlled in a desired range by selecting as appropriate the type of polymerizable groups of monomers used in forming the resin, the type and constituent ratio of substituents on the monomers, the molecular weight of polymer molecules contained in the resin particles, and the like.

As the glass transition temperature, the measured Tg obtained by actual measurement is used. Specifically, the measured Tg refers to a value measured under usual measurement conditions using a differential scanning calorimeter (DSC) EXSTAR6220 (trade name) manufactured by SII Nanotechnology Inc. In a case in which the measurement is difficult due to decomposition of resin or the like, the calculated Tg obtained by calculation according to the following calculation formula is used. The calculated Tg is obtained by calculation according to the following Equation (1).

$$1/Tg = \Sigma(X_i/Tg_i) \tag{1}$$

Here, a polymer as a calculation target is assumed that n kinds of monomer components of i=1 to n are copolymerized. $X_i$ represents the weight fraction ($\Sigma X_i=1$) of the i-th monomer, and $Tg_i$ represents the glass transition temperature (absolute temperature) of a homopolymer of the i-th monomer. $\Sigma$ represents the sum of i=1 to n. As the value ($Tg_i$) of the glass transition temperature of a homopolymer of each monomer, the values described in "Polymer Handbook" (3rd Edition) (written by J. Brandrup and E. H. Immergut (Wiley-Interscience, 1989)) are employed.

The resin particles are not particularly limited as long as they have a desired glass transition temperature. Examples of the resin particles include particles of resin, for example, a thermoplastic acrylic, epoxy, polyurethane, polyether, polyamide, unsaturated polyester, phenol, silicone, or fluoro resin, a polyvinyl resin such as vinyl chloride, vinyl acetate, polyvinyl alcohol, or polyvinyl butyral, a polyester resin such as an alkyd resin or a phthalic acid resin, or a copolymer or a mixture thereof.

In the present invention, the present inventors have found that, in a case in which hydrophobic resin particles as described above are used, and further, a hydrophobic nonionic surfactant (having a low HLB value) is used alone in the ink, reduction in dot diameter occurs after storage under a high temperature environment in which the temperature is higher than ordinary temperature. It is guessed that irreversible adsorption of the surfactant in the ink to the surface of the resin particles may occur under a high temperature environment higher than ordinary temperature. In the case of using hydrophobic resin particles, this phenomenon may occur easily.

In the present invention, even in the case of using such hydrophobic resin particles, reduction in dot diameter after storage under a high temperature environment can be suppressed.

In the present invention, as the resin particles, particles of a self-dispersing polymer (hereinbelow, may be referred to as "self-dispersing resin particles") are incorporated, from the viewpoints of the ejection stability, and the liquid stability (particularly, dispersion stability) in a case of using the pigment. Among the self-dispersing resin particles, self-dispersing resin particles having a carboxyl group are more preferred. The self-dispersing resin particles mean particles of a water-insoluble polymer which can form a dispersed state in an aqueous medium by means of a functional group (particularly, an acidic group or a salt thereof) included in the polymer per se in the absence of an additional surfactant, and are water-insoluble polymer particles which do not contain a free emulsifier. Further, when the self-dispersing resin is used, delaying in aggregation caused by the free emulsifier may be less likely to occur. Therefore, using the self-dispersing resin is preferable from the viewpoint of aggregating properties, and is also preferable since a high resolution image may be formed in a case in which high speed recording is employed.

Here, the meaning of "dispersed state" includes an emulsified state where the water-insoluble polymer is dispersed in a liquid state in an aqueous medium (emulsion) and a dispersed state where the water-insoluble polymer is dispersed in a solid state in an aqueous medium (suspension). The water-insoluble polymer in the invention is preferably such a water-insoluble polymer that can form a dispersed state where the water-insoluble polymer is dispersed in a solid state, from the viewpoints of the aggregation speed and the fixability when it is used in a liquid composition.

The dispersed state of the self-dispersing resin particles means such a state where stable presence of a dispersed state can be confirmed visually at 25° C. for at least one week after mixing a solution obtained by dissolving 30 g of a water-insoluble polymer in 70 g of an organic solvent (for example, methyl ethyl ketone), a neutralizing agent capable of neutralizing a salt-forming group of the water-insoluble polymer to 100% (sodium hydroxide when the salt-forming group is anionic or acetic acid when the salt-forming group is cationic), and 200 g of water, and stirring the resulting mixture (apparatus: a stirrer equipped with a stirring blade, number of rotation: 200 rpm, 30 min, 25° C.), and then removing the organic solvent from the liquid mixture.

The water-insoluble polymer means a polymer which is dissolved in an amount (amount of dissolution) of 10 g or less when the polymer is dried at 105° C. for 2 hours and then dissolved in 100 g of water at 25° C. The amount of dissolution is preferably 5 g or less and more preferably 1 g or less. The amount of dissolution is the amount of dissolution when the polymer has been neutralized to 100% with sodium hydroxide or acetic acid in accordance with the kind of the salt-forming group of the water-insoluble polymer.

The aqueous medium includes water, and may include, if necessary, a hydrophilic organic solvent. In the invention, the aqueous medium preferably includes water and a hydrophilic organic solvent in an amount of 0.2% by mass or less relative to water. More preferably, the aqueous medium consists of water.

The main chain skeleton of the resin used in the resin particles in the invention is not particularly limited and, for example, a vinyl polymer or a condensation polymer (an epoxy resin, polyester, polyurethane, polyamide, cellulose, polyether, polyurea, polyimide, polycarbonate, or the like) can be used. Among them, a vinyl polymer is particularly preferred. From the viewpoint of dispersion stability of the resin particles, (meth)acrylic resin particles are more preferred. Note that, the term "(meth)acrylic resin" means methacrylic resin or acrylic resin.

Preferred examples of the vinyl polymer and the monomer used for the vinyl polymer may include those described in JP-A Nos. 2001-181549 and 2002-88294. Further, vinyl polymers introduced with a dissociative group to a terminal of a polymer chain by radical polymerization of a vinyl monomer using a chain transfer agent, a polymerization initiator, or an iniferter, each having a dissociative group (or a substituent that can be induced to a dissociative group) or by ionic polymerization using a compound having a dissociative group (or a substituent that can be induced to a dissociative group) to an initiator or a terminator can also be used. Preferred examples of the condensation polymer and monomers used for the condensation polymers may include those described in JP-A No. 2001-247787.

The self-dispersing resin particles in the invention preferably include a water-insoluble polymer including a hydrophilic constituent unit and, as a hydrophobic constituent unit, at least one kind of constituent unit derived from an alicyclic monomer, from the viewpoint of the self-dispersibility. In addition to these, the water-insoluble polymer may further include a constituent unit derived from an aromatic group-containing monomer.

The hydrophilic constituent unit is not particularly limited so long as it is derived from hydrophilic group-containing monomer(s), and the hydrophilic constituent units may be either derived from one kind of hydrophilic group-containing monomer or derived from two or more kinds of hydrophilic group-containing monomers. The hydrophilic group is not particularly limited and may be either a dissociative group or a nonionic hydrophilic group. The hydrophilic group is preferably a dissociative group, from the viewpoint of promoting the self-dispersibility and from the viewpoint of stability of the formed emulsified or dispersed state, and more preferably an anionic dissociative group. Examples of the dissociative group include a carboxyl group, a phosphoric acid group, and a sulfonic acid group. Among them, a carboxyl group is preferred from the viewpoint of the fixability in a case in which the ink composition is formed.

The hydrophilic group-containing monomer is preferably a dissociative group-containing monomer, and more preferably a dissociative group-containing monomer having a dissociative group and an ethylenically unsaturated bond, from the viewpoints of the self-dispersibility and the aggregation property. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy ethyl succinic acid. Specific examples of the unsaturated sulfonic acid monomer include styrenesulfonic acid, 2-acrylamido-2-methylpropane sulfonic acid, 3-sulfopropyl(meth)acrylate, and bis(3-sulfopropyl)itaconate. Specific examples of the unsaturated phosphoric acid monomer include vinyl phosphonic acid, vinyl phosphate, bis(methacryloyloxyethyl)phosphate, diphenyl 2-acryloyloxy ethyl phosphate, diphenyl 2-methacryloyloxy ethyl phosphate, and dibutyl 2-acryloyloxy ethyl phosphate.

Among the dissociative group-containing monomers, an unsaturated carboxylic acid monomer is preferred, and at least one of acrylic acid or methacrylic acid is more preferred, from the viewpoints of the dispersion stability and the ejection stability.

Examples of monomers having a nonionic hydrophilic group include: ethylenically unsaturated monomers containing a (poly)ethyleneoxy group or a polypropyleneoxy group, such as 2-methoxy ethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight of from 200 to 1,000) monomethacrylate, or polyethylene glycol (molecular weight of from 200 to 1,000) monomethacrylate; and ethylenically unsaturated monomers containing a hydroxyl group, such as hydroxymethyl (meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl (meth)acrylate.

The monomers containing a nonionic hydrophilic group are more preferably an ethylenically unsaturated monomer having alkyl ether at the terminal rather than an ethylenically unsaturated monomer having a hydroxyl group at the terminal, from the viewpoints of the stability of the particles and the content amount of water-soluble components.

With regard to the hydrophilic constituent unit, in an embodiment, only hydrophilic unit(s) containing an anionic dissociative group may preferably be included, and in another embodiment, both hydrophilic constituent unit(s) containing an anionic dissociative group and hydrophilic constituent unit(s) containing a nonionic hydrophilic group may preferably be included.

Further, in an embodiment, two or more kinds of hydrophilic units each containing an anionic dissociative group may be preferably included, and in another embodiment, two or more kinds of hydrophilic constituent units including one or more kinds of hydrophilic constituent units each containing an anionic dissociative group and one or more kinds of hydrophilic constituent units each containing a nonionic hydrophilic group in combination, may be preferably included.

The content of the hydrophilic constituent units in the self-dispersing polymer is preferably 25% by mass or lower, more preferably from 1% by mass to 25% by mass, even more preferably from 2% by mass to 23% by mass, and particularly preferably from 4% by mass to 20% by mass, from the viewpoints of viscosity and stability over time of the ink composition.

Further, in a case in which two or more kinds of hydrophilic constituent units are contained, the total content of the hydrophilic constituent units is preferably within the range described above.

The content of the constituent units containing an anionic dissociative group in the self-dispersing polymer is preferably in a range by which the acid value is in a preferable range described below. The content of the constituent units containing a nonionic hydrophilic group is preferably from 0% by mass to 25% by mass, more preferably from 0% by mass to 20% by mass, and particularly preferably from 0% by mass to 15% by mass, from the viewpoints of ejection stability and stability over time.

The self-dispersing resin particles preferably includes a polymer containing a carboxyl group, and more preferably includes a polymer containing a carboxyl group and having an acid value (mgKOH/g) of from 25 to 100, from the viewpoints of self-dispersibility and an aggregation speed when contacting with the treatment liquid in performing recording using the treatment liquid which is described below. The acid value is more preferably from 25 to 80, and particularly preferably from 30 to 65, from the viewpoint of the self-dispersibility and the aggregation speed when contacting with the treatment liquid. In particular, when the acid value is 25 or more, the stability of self-dispersibility becomes favorable, and when the acid value is 100 or lower, aggregation properties are improved.

The alicyclic monomer is not particularly limited as long as it is a compound containing an alicyclic hydrocarbon group and a polymerizable group, and is preferably alicyclic(meth)acrylate from the viewpoint of dispersion stability.

The alicyclic(meth)acrylate has a structural portion derived from (meth)acrylic acid and a structural portion derived from alcohol, and the structural portion derived from alcohol contains at least one unsubstituted or substituted alicyclic hydrocarbon group. The alicyclic hydrocarbon group may be the structural portion derived from alcohol itself or may be bonded to the structural portion derived from alcohol via a linking group. Note that, the term "alicyclic(meth)acrylate" refers to methacrylate having an alicyclic hydrocarbon group or acrylate having an alicyclic hydrocarbon group.

The alicyclic hydrocarbon group is not particularly limited as long as it contains a cyclic non-aromatic hydrocarbon group. Examples thereof include a monocyclic hydrocarbon group, a bicyclic hydrocarbon group, and a polycyclic hydrocarbon group of tri- or higher cycle. Examples of the alicyclic hydrocarbon group may include a cycloalkyl group, such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, and a tricyclo[$5.2.1.0^{2,6}$]decanyl group, and bicyclo[4.3.0]nonane. The alicyclic hydrocarbon group may further have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group. Further, the alicyclic hydrocarbon group may form a condensed ring.

The alicyclic hydrocarbon group in the invention preferably has an alicyclic hydrocarbon group portion having from 5 to 20 carbon atoms, from the viewpoints of viscosity and solubility.

Preferable examples of a linking group that bonds the alicyclic hydrocarbon group to the structural portion derived from alcohol include an alkyl group, an alkenyl group, an alkylene group, an aralkyl group, an alkoxy group, a mono- or oligo-ethylene glycol group, and a mono- or oligo-propylene glycol group, each having from 1 to 20 carbon atoms.

Specific examples of the alicyclic(meth)acrylate are shown below, but the invention is not limited thereto. These compounds may be used alone, or two or more kinds of these compounds may be used as a mixture.

Examples of the monocyclic(meth)acrylate include cycloalkyl(meth)acrylate having a cycloalkyl group having from 3 to 10 carbon atoms, such as cyclopropyl(meth)acrylate, cyclobutyl(meth)acrylate, cyclopentyl(meth)acrylate, cyclohexyl(meth)acrylate, cycloheptyl (meth)acrylate, cyclooctyl(meth)acrylate, cyclononyl(meth)acrylate, and cyclodecyl (meth)acrylate. Examples of the bicyclic(meth) acrylate include isobornyl(meth)acrylate and norbornyl (meth)acrylate. Examples of the tricyclic(meth)acrylate include adamantyl (meth)acrylate, dicyclopentanyl (meth) acrylate, and dicyclopentenyloxyethyl(meth)acrylate. Among the above, from the viewpoints of the dispersion stability of the self-dispersing resin particles, fixability, and blocking resistance, at least one of bicyclic(meth)acrylate or polycyclic(meth)acrylate of tri- or higher cycle is preferable, and at least one selected from isobornyl(meth)acrylate, adamantyl(meth)acrylate, and dicyclopentanyl(meth)acrylate is more preferable.

In the invention, the content of the constituent units derived from alicyclic (meth)acrylate contained in the self-dispersing resin particles is preferably from 20% by mass to 90% by mass, and more preferably from 40% by mass to 90% by mass, from the viewpoints of the stability of a self-dispersion state, stabilization of the particle shape in an aqueous medium due to hydrophobic interaction between the alicyclic hydrocarbon groups, and reduction in the amount of water-soluble components due to appropriate hydrophobizing of particles. The content thereof is particularly preferably from 50% by mass to 80% by mass. When the content of the constituent units derived from alicyclic(meth)acrylate is 20% by mass or higher, fixability and blocking resistance may be improved. In contrast, when the content of the constituent units derived from alicyclic(meth)acrylate is 90% by mass or lower, the stability of polymer particles may be improved.

Further, in a case in which a constituent unit derived from an aromatic group-containing monomer is included, the aromatic group-containing monomer is not particularly limited so long as it is a compound containing an aromatic group and a polymerizable group. The aromatic group may be either a group derived from an aromatic hydrocarbon or a group derived from an aromatic heterocycle. In the invention, the aromatic group is preferably an aromatic group derived from an aromatic hydrocarbon, from the viewpoint of particle shape stability in the aqueous medium. Further, the polymerizable group may be either a polycondensating polymerizable group or an addition polymerization polymerizable group. The polymerizable group is preferably an addition polymerization polymerizable group, and more preferably a group containing an ethylenically unsaturated bond, from the viewpoint of particle shape stability in the aqueous medium.

The aromatic group-containing monomer is preferably a monomer containing an aromatic group derived from an aromatic hydrocarbon and an ethylenically unsaturated bond. One kind of aromatic group-containing monomer may be used alone, or two or more kinds of aromatic group-containing monomers may be used in combination. Examples of the aromatic group-containing monomer include phenoxyethyl (meth)acrylate, benzyl (meth)acrylate, phenyl(meth)acrylate, and styrene monomer. Among them, from the viewpoints of the balance of the hydrophilicity and the hydrophobicity of the polymer chain and the ink fixability, an aromatic group-containing (meth)acrylate monomer is preferable, and at least one selected from the group consisting of phenoxyethyl (meth)acrylate, benzyl (meth)acrylate, and phenyl(meth) acrylate is more preferable, and phenoxyethyl (meth)acrylate and benzyl(meth)acrylate are even more preferable.

In a case in which a styrene monomer is used as the aromatic group-containing monomer, the content of the constituent units derived from the styrene monomer is preferably 20% by mass or lower, more preferably 10% by mass or lower, and even more preferably 5% by mass or lower, from the viewpoint of stability of self-dispersing resin particles in which the monomer is used. It is particularly preferable that the self-dispersing resin particles do not contain a constituent unit derived from a styrene monomer.

Here, the styrene monomer refers to styrene, substituted styrene (α-methylstyrene, chlorostyrene, or the like), or a styrene macromer having a polystyrene structural unit.

As needs arise, the self-dispersing resin particles may include, for example, as a hydrophobic constituent unit, additional constituent unit(s) as well as a constituent unit derived from an aromatic group-containing monomer, in addition to a constituent unit derived from an alicyclic monomer. The monomer which may be used for forming the additional constituent unit (hereinafter, may also be referred to as an "additional copolymerizable monomer") is not particularly limited so long as it is a monomer copolymerizable with the hydrophilic group-containing monomer, the aromatic group-containing monomer, and the alicyclic monomer. In particular, an alkyl group-containing monomer is preferred from the viewpoint of the flexibility of the polymer skeleton or ease of control of the glass transition temperature (Tg).

Examples of the alkyl group-containing monomer include alkyl(meth)acrylates such as methyl(meth)acrylate, ethyl (meth)acrylate, isopropyl(meth)acrylate, n-propyl (meth) acrylate, n-butyl(meth)acrylate, isobutyl(meth)acrylate, t-butyl(meth)acrylate, hexyl (meth)acrylate, or ethylhexyl (meth)acrylate; ethylenically unsaturated monomers having a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl (meth)acrylate, or hydroxyhexyl(meth)acrylate; dialkylaminoalkyl (meth)acrylates such as dimethylaminoethyl(meth)acrylate; (meth)acrylamides, for example, N-hydroxyalkyl(meth) acrylamide such as N-hydroxymethyl(meth)acrylamide, N-hydroxyethyl(meth)acrylamide, or N-hydroxybutyl(meth) acrylamide; or N-alkoxyalkyl(meth)acrylamides such as N-methoxymethyl(meth)acrylamide, N-ethoxymethyl (meth)acrylamide, N-(n-, iso)butoxymethyl(meth)acrylamide, N-methoxyethyl(meth)acrylamide, N-ethoxyethyl (meth)acrylamide, or N-(n-, iso)butoxyethyl(meth) acrylamide.

In particular, from the viewpoint of the flexibility of a polymer skeleton or ease of control of the glass transition temperature (Tg) and from the viewpoint of dispersion stability of a self-dispersing polymer, at least one of (meth) acrylates containing a chain alkyl group having from 1 to 8 carbon atoms is preferable, (meth)acrylate containing a chain alkyl group having from 1 to 4 carbon atoms is more preferable, and methyl(meth)acrylate or ethyl (meth)acrylate is particularly preferable. Here, the chain alkyl group refers to a straight chain or branched alkyl group.

One kind of the additional copolymerizable monomer may be used alone, or two or more kinds of the additional copolymerizable monomers may be used in combination. In a case in which the self-dispersing resin particles contain the additional constituent units, the content of the additional constituent units is preferably from 10% by mass to 80% by mass, more preferably from 15% by mass to 75% by mass, and particularly preferably from 20% by mass to 70% by mass. In a case in which two or more kinds of monomers which form the additional constituent unit(s) are used in combination, the total content thereof is preferably in the range described above.

The self-dispersing resin in the invention is also preferably a polymer obtained by polymerizing at least three monomers including at least one alicyclic(meth)acrylate, an additional copolymerizable monomer including an aromatic group-containing (meth)acrylate, and a hydrophilic group-containing monomer, from the viewpoint of dispersion stability, and more preferably a polymer obtained by polymerizing at least three monomers including at least one alicyclic(meth)acrylate, an alkyl group-containing (meth)acrylate containing a straight chain or branched alkyl group having from 1 to 8 carbon atoms, and a hydrophilic group-containing monomer. In the invention, the self-dispersing resin is preferably a self-dispersing resin which does not substantially contain a constituent unit having a substituent having high hydrophobicity such as a constituent unit derived from (meth)acrylate having a straight chain or branched alkyl group having 9 or more carbon atoms, a constituent unit derived from an aromatic group-containing macromonomer, or the like, and the self-dispersing resin is more preferably a self-dispersing resin which does not contain a constituent unit having a substituent having high hydrophobicity such as a constituent unit derived from (meth)acrylate having a straight chain or branched alkyl group having 9 or more carbon atoms, a constituent unit derived from an aromatic group-containing macromonomer, or the like, from the viewpoint of dispersion stability.

The self-dispersing resin may be a random copolymer in which each constituent unit is irregularly introduced or a block copolymer in which each constituent unit is regularly introduced. In the case of a block copolymer, each constituent unit may be synthesized in any introduction order and the same constituent component may be used twice or more. A random copolymer is preferable in terms of versatility and manufacturability.

The molecular weight of the self-dispersing resin is preferably from 3,000 to 200,000, more preferably from 5,000 to 150,000, and even more preferably from 10,000 to 100,000, as the weight average molecular weight. Further, the self-dispersing polymer preferably has an acid value of from 25 to 100 and a weight average molecular weight of from 3,000 to 200,000, and the self-dispersing polymer more preferably has an acid value of from 25 to 95 and a weight average molecular weight of from 5,000 to 150,000. When the weight average molecular weight is 3,000 or more, the amount of the water-soluble component can be suppressed effectively. Further, when the weight average molecular weight is 200,000 or less, the self-dispersion stability can be enhanced. The weight average molecular weight is measured by gel permeation chromatography (GPC). In GPC, HLC-8020GPC (manufactured by Tosoh Corporation) is used, and 3 pieces of columns of TSK GEL SUPER HZM-H, TSK GEL SUPER HZ4000, and TSK GEL SUPER HZ200 (all trade names, manufactured by Tosoh Corporation, 4.6 mm ID×15 cm) are used, and THF (tetrahydrofuran) is used as an eluate.

It is preferable that the self-dispersing resin in the invention contains constituent unit(s) derived from alicyclic(meth) acrylate(s) (preferably, structural units derived from at least one of isobornyl(meth)acrylate, adamantyl(meth)acrylate, or dicyclopentanyl (meth)acrylate) in a proportion of from 15% by mass to 80% by mass of the total mass of the self-dispersing resin particles as a copolymerization ratio, and has an acid value of from 25 to 100 and a weight average molecular weight of from 3,000 to 200,000, from the viewpoint of controlling hydrophilic and hydrophobic properties of the polymer.

It is also preferable that the self-dispersing resin contains constituent unit(s) derived from constituent unit(s) derived from alicyclic(meth)acrylate(s) (preferably, structural unit(s) derived from at least one of isobornyl(meth)acrylate, adamantyl(meth)acrylate, or dicyclopentanyl(meth)acrylate) in a proportion of from 15% by mass to 80% by mass of the total mass of the self-dispersing resin particles as a copolymerization ratio, a constituent unit derived from carboxyl group-containing monomer(s), and a constituent unit derived from alkyl group-containing monomer(s) (preferably, a structural unit derived from an alkyl ester of (meth)acrylic acid), from the viewpoint of controlling hydrophilic and hydrophobic properties of the polymer. It is more preferable that the self-dispersing resin contains structural unit(s) derived from at least one of isobornyl(meth)acrylate, adamantyl(meth)acrylate, or dicyclopentanyl (metha)acrylate in a proportion of from 15% by mass to 80% by mass as a copolymerization ratio, a constituent unit derived from carboxyl group-containing monomer(s), and a constituent unit derived from alkyl group-containing monomer(s) (preferably, a structural unit derived from an ester of alkyl having from 1 to 4 carbon atoms and (meth)acrylic acid), and has an acid value of from 25 to 95 and a weight average molecular weight of from 5,000 to 150,000.

It is also preferable that the self-dispersing resin of the present invention is a vinyl polymer that contains structure(s) derived from alicyclic(meth)acrylate(s) (preferably, structural unit(s) derived from at least one of isobornyl(meth) acrylate, adamantyl (meth)acrylate, or dicyclopentanyl (meth)acrylate) in a proportion of from 20% by mass to 90% by mass as a copolymerization ratio, structure(s) derived from dissociative group-containing monomer(s), and at least one structure derived from (meth)acrylate(s) containing a chain alkyl group having from 1 to 8 carbon atoms, has an acid value of from 20 to 120, has a total content of hydrophilic structural units of 25% by mass or lower, and has a weight average molecular weight of from 3,000 to 200,000, from the viewpoint of controlling hydrophilic and hydrophobic properties of the polymer. It is more preferable that the self-dispersing resin of the invention is a vinyl polymer that contains a structure derived from bicyclic(meth)acrylate(s) or polycyclic(meth)acrylate(s) of tri- or higher cycle (preferably, a structural unit derived from at least one of isobornyl (meth)acrylate, adamantyl(meth)acrylate, or dicyclopentanyl (metha)acrylate) in a proportion of from 30% by mass to 90% by mass as a copolymerization ratio, a structure derived from (meth)acrylate(s) containing a chain alkyl group having from 1 to 4 carbon atoms in a proportion of from 10% by mass to 80% by mass as a copolymerization ratio, and a structure derived from carboxyl group-containing monomer(s) in such an amount that the acid value is in the range of from 25 to 100, has a total content of hydrophilic structural units of 25% by mass or lower, and has a weight average molecular weight of from 10,000 to 200,000. It is particularly preferable that the self-dispersing resin of the invention is a vinyl polymer that contains a structure derived from bicyclic(meth)acrylate(s) or polycyclic(meth)acrylate(s) of tri- or higher cycle (preferably, a structural unit derived from at least one of isobornyl (meth)acrylate, adamantyl(meth)acrylate, or dicyclopentanyl (metha)acrylate) in a proportion of from 40% by mass to 80% by mass as a copolymerization ratio, a structure derived from at least methyl(meth)acrylate(s) or ethyl (meth)acrylate(s) in a proportion of from 20% by mass to 70% by mass as a copolymerization ratio, and a structure derived from acrylic acid(s) or methacrylic acid(s) in such an amount that the acid value is in the range of from 30 to 80, has a total content of hydrophilic structural units of 25% by mass or lower, and has a weight average molecular weight of from 30,000 to 150,000.

Specific examples of polymers used in the resin particles include the following alicyclic group-containing polymers, but the invention is not limited to these specific examples. The ratio in the parentheses represents the mass ratio of the copolymerization components. In a case in which the glass transition temperature is a "calculated Tg", the glass transition temperature is a value obtained by the calculation according to Equation (1) described above using a Tg value of a homopolymer of each of the following monomers. That is, [Tg=a homopolymer of methyl methacrylate: 105° C., isobornyl methacrylate: 156° C., benzyl methacrylate: 54° C., methacrylic acid: 130° C., adamantyl methacrylate: 140° C., and dicyclopentanyl methacrylate: 128° C.].

Methyl methacrylate/isobornyl methacrylate/methacrylic acid copolymer (20/72/8), glass transition temperature Tg: 180° C.

Methyl methacrylate/isobornyl methacrylate/methacrylic acid copolymer (30/62/8), glass transition temperature Tg: 170° C.

Methyl methacrylate/isobornyl methacrylate/methacrylic acid copolymer (40/52/8), glass transition temperature Tg: 160° C.

Methyl methacrylate/isobornyl methacrylate/methacrylic acid copolymer (50/42/8), glass transition temperature Tg: 150° C.

Methyl methacrylate/isobornyl methacrylate/benzyl methacrylate/methacrylic acid copolymer (30/50/14/6), glass transition temperature Tg: 123° C.

Methyl methacrylate/dicyclopentanyl methacrylate/methacrylic acid copolymer (40/50/10), glass transition temperature Tg: 130° C.

Methyl methacrylate/dicyclopentanyl methacrylate/phenoxyethyl methacrylate/methacrylic acid copolymer (30/50/14/6), glass transition temperature Tg: 101° C.

Methyl methacrylate/isobornyl methacrylate/methoxypolyethylene glycol methacrylate (n=2)/methacrylic acid copolymer (30/54/10/6), glass transition temperature Tg: 110° C.

Methyl methacrylate/dicyclopentanyl methacrylate/methoxypolyethylene glycol methacrylate (n=2)/methacrylic acid copolymer (54/35/5/6), glass transition temperature Tg: 100° C.

Methyl methacrylate/adamantyl methacrylate/methoxypolyethylene glycol methacrylate (n=23)/methacrylic acid copolymer (30/50/15/5), glass transition temperature Tg: 112° C.

Methyl methacrylate/isobornyl methacrylate/dicyclopentanyl methacrylate/methacrylic acid copolymer (20/50/22/8), glass transition temperature Tg: 139° C.

Ethyl methacrylate/cyclohexyl methacrylate/acrylic acid copolymer (50/45/5), glass transition temperature Tg: 67° C.

Isobutyl methacrylate/cyclohexyl methacrylate/acrylic acid copolymer (40/50/10), glass transition temperature Tg: 70° C.

n-Butyl methacrylate/cyclohexyl methacrylate/styrene/acrylic acid copolymer (30/55/10/5), glass transition temperature Tg: 86° C.

Methyl methacrylate/dicyclopentenyloxyethyl methacrylate/methacrylic acid copolymer (40/52/8), glass transition temperature Tg: 78° C.

Lauryl methacrylate/dicyclopentenyloxyethyl methacrylate/methacrylic acid copolymer (3/87/10), glass transition temperature Tg: 53° C.

Phenoxyethyl acrylate/methyl methacrylate/acrylic acid copolymer (20/70/10), glass transition temperature Tg: 71° C.

The method of producing a water-insoluble polymer that is used in the resin particles in the invention is not particularly limited. Examples of the method of producing the water-insoluble polymer may include a method of performing emulsion polymerization in the presence of a polymerizable surfactant thereby covalently bonding the surfactant and the water-insoluble polymer, and a method of copolymerizing a monomer mixture containing the hydrophilic group-containing monomer and the aromatic group-containing monomer by a known polymerization method such as a solution polymerization method or a bulk polymerization method. Among the polymerization methods described above, a solution polymerization method is preferred, and a solution polymerization method in which an organic solvent is used is more preferred, from the viewpoints of the aggregation speed and the stability of droplet ejection of the ink composition.

From the viewpoint of the aggregation speed, it is preferred that the self-dispersing resin particles in the invention contain a polymer synthesized in an organic solvent, and the polymer has a carboxyl group (the acid value is preferably from 20 to 100), in which the carboxyl groups of the polymer are Partially or entirely neutralized and the polymer is prepared as a polymer dispersion in a continuous phase of water. That is, the self-dispersing resin particle in the invention is preferably produced by a method including a process of synthesizing the polymer in an organic solvent and a dispersion process of forming an aqueous dispersion in which at least a portion of the carboxyl groups of the polymer is neutralized.

The dispersion process preferably includes the following process (1) and process (2).

Process (1): stirring a mixture containing a polymer (water-insoluble polymer), an organic solvent, a neutralizing agent, and an aqueous medium.

Process (2): removing the organic solvent from the mixture.

The process (1) is preferably a treatment that includes, first, dissolving the polymer (water-insoluble polymer) in the organic solvent and then gradually adding the neutralizing agent and the aqueous medium, and mixing and stirring the mixture to obtain a dispersion. By adding the neutralizing agent and the aqueous medium to the solution of the water-insoluble polymer dissolved in the organic solvent, self-dispersing resin particles having a particle size that enables higher storage stability can be obtained without requiring strong sharing force.

The method for stirring the mixture is not particularly limited, and a mixing and stirring apparatus that is generally used can be used, and as necessary, a disperser such as an ultrasonic disperser or a high pressure homogenizer can be used.

Preferable examples of the organic solvent include alcohol type solvents, ketone type solvents and ether type solvents. Details and preferable embodiments of the organic solvents are described in paragraph 0072 of Japanese Patent No. 4,625,133. When any of these solvents is used, self-dispersing resin particles having a small particle size and a high dispersion stability with less aggregation settling or fusion between particles may be obtained.

The neutralizing agent is used to partially or entirely neutralize the dissociative groups so that the self-dispersing resin can form a stable emulsified or dispersed state in water. Details and preferable embodiments of the neutralizing agent are described in paragraph 0072 of Japanese Patent No. 4,625,133.

In the process (2), an aqueous dispersion of the self-dispersing resin particles can be obtained by phase transfer to the aqueous system by distilling off the organic solvent from the dispersion obtained in the process (1) by a common method such as distillation under a reduced pressure. In the obtained aqueous dispersion, the organic solvent has been substantially removed and the amount of the organic solvent is preferably from 0.2% by mass or less, and more preferably 0.1% by mass or less.

The average particle diameter of the resin particles is, as a volume average particle diameter, preferably in a range of from 10 nm to 1 μm, more preferably in a range of from 10 nm to 200 nm, even more preferably in a range of from 10 nm to 100 nm, and particularly preferably in a range of from 10 nm to 50 nm. When the volume average particle diameter is 10 nm or more, production suitability may be enhanced, and when the volume average particle diameter is 1 μm or less, storage stability may be enhanced. The particle size distribution of the resin particles is not particularly limited, and any of those particles having a broad particle size distribution or those particles having a monodispersed particle size distribution may be used. Two or more kinds of resin particles having a monodispersed particle size distribution may be used as a mixture.

The average particle diameter and particle size distribution of the resin particles are determined by measuring the volume average particle diameter by a dynamic light scattering method, using a NANOTRACK particle size distribution analyzer UPA-EX150 (trade name, manufactured by Nikkiso Co., Ltd.).

One kind of the self-dispersing resin particles may be used alone, or two or more kinds of the self-dispersing resin particles may be used as a mixture.

The content of the self-dispersing resin particles in the ink composition is preferably from 0.5% by mass to 20% by mass, more preferably from 2% by mass to 20% by mass, and even more preferably from 3% by mass to 15% by mass, relative to the total mass of the ink composition.

The content of the resin particles relative to the total mass of solids in the ink composition is preferably 40% by mass or higher. With the ratio of the resin particles relative to the total mass of solids being in the range described above, in a case in which high speed recording is performed using, for example, a single pass method or the like, sufficient aggregation properties for obtaining high resolution images may be obtained and the occurrence of blocking and offset can be effectively suppressed. Due to the same reason as described above, the content of the resin particles in the ink composition is more preferably from 40% by mass to 90% by mass, even more preferably from 40% by mass to 80% by mass, and most preferably from 50% by mass to 70% by mass, relative to the total mass of solids in the ink composition.

Since a free emulsifier is not included, it is guessed that the hydrophobic nonionic surfactant (having a low HLB value) contained in the ink adsorbs more easily to the above-described self-dispersing resin particles, and reduction in dot diameter occurs easily. However, in the present invention, even in the case of using self-dispersing resin particles as described above, reduction in dot diameter after storage under a high temperature environment can be effectively suppressed.

Further, as the content of the resin particles relative to the total mass of solids in the ink composition increases, the adsorption amount of the hydrophobic nonionic surfactant (having a low HLB value) in the ink increases, and reduction in dot diameter occurs more easily, however, in the present invention, even though the content of the resin particles is 40% by mass or higher relative to the total mass of solids in the ink composition, reduction in dot diameter after storage under a high temperature environment can be effectively suppressed.

Nonionic Surfactant

The present invention includes two or more types of nonionic surfactants including at least one type of (a) nonionic surfactant having an HLB of from 15 to 19 and at least one type of (b) nonionic surfactant having an HLB of 10 or more but less than 15. The nonionic surfactant that satisfies 15≤HLB≤19 has relatively high hydrophilicity, is less likely to adsorb onto the surface of the resin particles, and has an effect on prevention of change in dot diameter due to heating. On the other hand, with this surfactant, the dynamic surface tension of the ink is less likely to be lowered, and there is a concern of reduction in ejection stability when the ink is ejected from nozzles, and therefore, the nonionic surfactant with 10≤HLB≤15 is used in combination.

The HLB (Hydrophile-Lipophile Balance) in the invention is defined by the following equation in accordance with the Griffin method (J. Soc. Cosmetic Chem., 5 (1954), 294), and is a value determined by calculation.

HLB value=20×Total formula weight of hydrophilic portions/Molecular weight

Note that, the term "dynamic surface tension" refers to a surface tension when the surface is in an unstable fluid state or stirring state, and is measured using a dynamic surface tensiometer, for example, at 1 Hz and 10 Hz of a 0.1% aqueous solution of the ink composition.

The (a) nonionic surfactant having an HLB of from 15 to 19 is not particularly limited besides the HLB value, and the one which is selected as appropriate from conventionally known nonionic surfactants exhibiting hydrophilicity can be used. In particular, a nonionic surfactant having an ethylene oxide chain (preferably, the addition mole number thereof is 15 or more) is preferable. Further, the HLB range is more preferably from 15 to 17.5. When the HLB is more than 19, ink foams easily and the foam is not easily disappears and, as a result, ejection defects may occur in successive printing or mist may occur frequently.

Further, the (b) nonionic surfactant having an HLB of 10 or more but less than 15 is not particularly limited besides the HLB value, and the one which is selected as appropriate from conventionally known relatively hydrophobic nonionic surfactants can be used. In particular, a nonionic surfactant having an ethylene oxide chain (preferably, the addition mole number thereof is 10 or less) is preferable. Further, the HLB range is more preferably from 10 to 14.5. When the HLB is less than 10, the solubility to the ink solvent decreases and, as a result, sufficient dispersibility may not be obtained.

In the invention, it is preferable that the ink composition contains (a) a nonionic surfactant having an HLB of from 15 to 17.5 and (b) a nonionic surfactant having an HLB of from 10 to 14.5, in terms of maintaining favorable ejection properties and also realizing excellent effect on prevention of reduction in dot diameter caused by exposure to a high temperature environment during storage.

The (a) nonionic surfactant having an HLB of from 15 to 19 and the (b) nonionic surfactant having an HLB of 10 or more but less than 15 are preferably selected from ethylene oxide adducts of acetylene glycol represented by the following Formula (1).

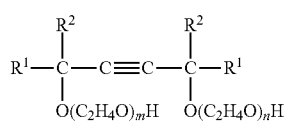

Formula (1)

In Formula (1) above, each of $R^1$ and $R^2$ independently represents an alkyl group having from 1 to 5 carbon atoms. Specific examples of the alkyl group having from 1 to 5 carbon atoms include a methyl group, an ethyl group, an isopropyl group, and a butyl group.

Each of m and n represents the addition mole number of ethylene oxide. Each of m and n independently represents a positive number of from 0.5 to 25, and m and n satisfy $m+n \geq 1$. Any value may be selected as long as m and n satisfy $m+n \geq 1$. It is preferable that m and n satisfy $1 \leq m+n \leq 40$, and from the viewpoint of prevention of reduction in dot diameter after storage under a high temperature environment higher than room temperature, it is more preferable that in and n satisfy $10 \leq m+n \leq 40$, and further, from the viewpoints of realizing both the recoverability after leaving and the continuous ejection properties and the like, it is particularly preferable that in and n satisfy $10 \leq m+n \leq 30$. The total addition mole number of ethylene oxide (i.e., m+n) of 40 or less may be effective in maintaining the dynamic surface treatment at a lower level.

Among the ethylene oxide adducts of acetylene glycol, which are represented by Formula (1) above, the (a) compound having an HLB of from 15 to 19 and the (b) compound having an HLB of 10 or more but less than 15 can be selected by selecting the groups represented by $R^1$ and $R^2$ and the values of m and n, considering the balance of hydrophilicity and hydrophobicity.

Specific examples of the ethylene oxide adducts of acetylene glycol, which are represented by Formula (1) above, may include ethylene oxide adducts of acetylene glycol such as 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 8-hexadecyne-7,10-diol, 7-tetradecyne-6,9-diol, 2,3,6,7-tetramethyl-4-octyne-3,6-diol, 3,6-diethyl-4-octyne-3,6-diol, 3,6-dimethyl-4-octyne-3,6-diol, or 2,5-dimethyl-3-hexyne-2,5-diol.

Concerning the at least two types of nonionic surfactants contained in present invention, the content ratio [(a)/(b); mass ratio] of (a) the nonionic surfactant having an HLB of from 15 to 19 relative to (b) the nonionic surfactant having an HLB of 10 or more but less than 15 is preferably in a range of from 10/1 to 1/1. When the ratio of the hydrophilic surfactant with a high HLB value relative to the hydrophobic surfactant with a low HLB value is high, the reduction in dot diameter of ink droplets may be prevented, and particularly, when the content ratio is 10/1 or less, the phenomenon of reduction in diameter caused by exposure to a high temperature environment during storage can be suppressed while maintaining the dynamic surface tension of the ink composition to be within the range appropriate for ejection.

The content ratio (a)/(b) is more preferably in a range of from 10/2 to 10/6, and particularly preferably in a range of from 10/2 to 10/4, in terms of preventing reduction in dot diameter caused by exposure to a high temperature environment during storage.

The total content of the nonionic surfactants in the ink composition is preferably from 0.25% by mass to 5% by mass, and more preferably from 0.5% by mass to 2% by mass, relative to the total amount of ink. When the total content is 0.25% by mass or higher, the ejection performance of the ink can be maintained at a favorable level. Further, the total content of 5% by mass or lower may be advantageous in view of storage stability of ink (the change in viscosity and the change in diameter of dispersed particles are small). Furthermore, when the total content is 2% by mass or lower, the fixation offset resistance and the blocking resistance may become more excellent.

Water-Soluble Organic Solvent

The ink composition of the present invention includes at least one water-soluble organic solvent. The water-soluble organic solvent may be used for drying prevention, wetting, or penetration promotion. For drying prevention, the water-soluble organic solvent is used as a drying preventing agent for preventing clogging of an ink ejection opening of an ejection nozzle due to an aggregate formed of adhered and dried inks. For preventing drying or for wetting, water-soluble organic solvents having a lower vapor pressure than that of water are preferable. For promoting penetration, the water-soluble organic solvents can be used as a penetration accelerator that enhances penetration properties of inks in paper.

Examples of the water-soluble organic solvents include alkanediols (polyhydric alcohols), such as glycerol, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; saccharides, such as glucose, mannose, or fructose; sugar alcohols; alkyl alcohols having from 1 to 4 carbon atoms, such as ethanol, methanol, butanol, propanol, or isopropanol; and glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, tripropylene glycol monomethyl ether, dipropylene glycol mono-n-propyl ether, or dipropylene glycol mono-iso-propyl ether.

One kind of these water-soluble organic solvents may be used alone, or two or more kinds of them may be used in combination.

For drying prevention or for wetting, polyhydric alcohols are useful. Examples of the polyhydric alcohols include glycerol, ethylene glycol, diethylene glycol, triethylene glycol, propylene glycol, dipropylene glycol, tripropylene glycol, 1,3-butanediol, and 2,3-butanediol. One kind of these polyhydric alcohols may be used alone, or two or more kinds of them may be used in combination.

For promoting penetration, polyol compounds are preferable and aliphatic diols are more preferable. Examples of the aliphatic diols include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among them, 2-ethyl-1,3-hexanediol and 2,2,4-trimethyl-1,3-pentanediol can be described as preferable examples.

In the ink composition of the present invention, it is preferable that one or more water-soluble organic solvents having an SP value of 27.5 or lower are used. It is also preferable that the content of the one or more water-soluble organic solvents having an SP value of 27.5 or lower is 70% by mass or more of the total water-soluble organic solvent(s). When the water-soluble organic solvent(s) having an SP value of 27.5 or lower are used, the occurrence of curling under various environmental humidity after recording can be further suppressed. Moreover, the fixability may also be improved due to interaction with resin particles. In particular, when the proportion of water-soluble organic solvents having a relatively low SP value is increased by adjusting the proportion of the water-soluble organic solvents having an SP value of 27.5 or lower to be 70% by mass or more of the whole water-soluble organic solvents, the scratch resistance of images can be improved and offset can be effectively suppressed.

The SP value (solubility parameter/unit: $(cal/cm^3)^{1/2}$) is a value expressed by the square root of cohesive energy of molecules. SP values can be calculated by the method described in R. F. Fedors, "Polymer Engineering Science", 14, pages 147 to 154 (1974).

Specifically, in the method described in the above scientific article by R. F. Fedors, the solubility parameter (SP value) of a particular water-soluble solvent at 25° C. can be calculated using the following equation.

$$\delta = \left[ \frac{\sum_i \Delta e_i}{\sum_i \Delta v_i} \right]^{1/2}$$

In the above equation, $\delta$ represents the solubility parameter (SP value) of the water-soluble solvent at 25° C.; $\Delta e_i$ is the additive atomic and group contribution for the energy of vaporization of the solvent; $\Delta v_i$ is the additive atomic and group contribution for the molar volume of the solvent; and the summation index i represents the number of atoms or groups within the molecular structure of the water-soluble solvent. The contributions $\Delta e_i$ and $\Delta v_i$ at a temperature of 25° C. are listed in Table 5 on page 152 of Fedors' article as identified above. Hence, based on only the knowledge of the chemical structure of the particular water-soluble solvent, i.e. the atoms and groups constituting the molecular structure thereof, the required contributions $\Delta e_i$ and $\Delta v_i$ can be selected from Table 5 of Fedors' paper, and on their basis, $\delta$ can be calculated using the above equation. In the event that the water-soluble solvent has a cyclic structure, the solubility parameter thereof can be estimated from the properties of a linear compound having the same chemical structure, and adding a cyclization increment $\Delta e_i$ and $\Delta v_i$, which increment is also listed in Table 5 of the paper. More details and a concrete example for calculating the solubility parameter of a cyclic water-soluble solvent are provided on pages 152 and 153 of Fedors' paper.

As will be appreciated from the above, according to a preferred embodiment, the SP value of the water-soluble solvent for use in the present invention refers to the SP value at a temperature of 25° C.

In order to prevent clogging at a nozzle opening of a head due to drying of ink-jet ink compositions at the nozzle head, the solvents can be used for preventing drying or for wetting. For drying prevention or for wetting, water-soluble organic solvents having a lower vapor pressure than that of water are preferable. In order to more sufficiently penetrate the ink composition in paper, the water-soluble organic solvents are preferably used for promoting the penetration.

Preferable examples of the water-soluble organic solvents having an SP value of 27.5 or lower include the following compounds.

Diethylene glycol monoethyl ether (SP value: 22.4)
Diethylene glycol monobutyl ether (SP value: 21.5)
Triethylene glycol monomethyl ether (SP value: 22.1)
Triethylene glycol monoethyl ether (SP value: 21.7)
Triethylene glycol monobutyl ether (SP value: 21.1)
Dipropylene glycol monomethyl ether (SP value: 21.3)
Dipropylene glycol (SP value: 27.2)
Tripropylene glycol monomethyl ether (SP value: 20.4), and an alkylene oxide adduct of glycerol represented by the following Structural Formula (1).

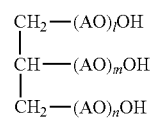

Structural Formula (1)

In Structural Formula (1), l, m, and n each independently represent an integer of 1 or more, and the sum of l, m and n (l+m+n) is from 3 to 15. When the value of l+m+n is 3 or more, the effect of suppressing curling may be favorable. When the value of l+m+n is 15 or lower, favorable ejection properties may be maintained. In particular, the value of l+m+n is preferably in a range of from 3 to 12 and more preferably in a range of from 3 to 10. AO in Formula (1) represents ethyleneoxy (which may sometimes be abbreviated as EO) and/or propyleneoxy (which may sometimes be abbreviated as PO). In particular, a propyleneoxy group is preferable. Each AO of $(AO)_l$, $(AO)_m$, and $(AO)_n$ may be the same or different.

Examples of the compound represented by Structural Formula (1) are shown below. Note that, the value in the parentheses is an SP value. However, the present invention is not limited to these examples.

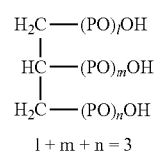

(26.4)

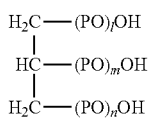 (24.9)

$H_2C$—$(PO)_l OH$
$HC$—$(PO)_m OH$
$H_2C$—$(PO)_n OH$
$l + m + n = 4$

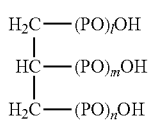 (23.9)

$H_2C$—$(PO)_l OH$
$HC$—$(PO)_m OH$
$H_2C$—$(PO)_n OH$
$l + m + n = 5$

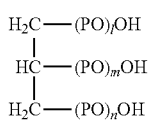 (23.2)

$H_2C$—$(PO)_l OH$
$HC$—$(PO)_m OH$
$H_2C$—$(PO)_n OH$
$l + m + n = 6$

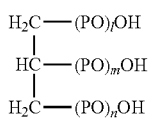 (22.6)

$H_2C$—$(PO)_l OH$
$HC$—$(PO)_m OH$
$H_2C$—$(PO)_n OH$
$l + m + n = 7$

PO = Propyleneoxy $nC_4H_9O(AO)_4$—H
(AO=EO or PO (EO:PO=1:1), SP value=20.1)
$nC_4H_9O(AO)_{10}$—H
(AO=EO or PO (EO:PO=1:1), SP value=18.8)
$HO(A'O)_{40}$—H
(A'O=EO or PO (EO:PO=1:3), SP value=18.7)
$HO(A''O)_{55}$—H
(A''O=EO or PO (EO:PO=5:6), SP value=18.8)
$HO(PO)_3$—H(SP value=24.7)
$HO(PO)_7$—H(SP value=21.2)
1,2-Hexanediol (SP value=27.4)

EO represents an ethyleneoxy group, and PO represents a propyleneoxy group.

As the alkylene oxide adduct of glycerol, any of commercially available products currently marketed may be used. Examples of the commercial available alkylene oxide adduct of glycerol include, as polyoxypropylated glycerol (ether of polypropylene glycol and glycerol), SANNIX GP-250 (average molecular weight 250), SANNIX GP-400 (average molecular weight 400), and SANNIX GP-600 (average molecular weight 600) (all trade names, manufactured by Sanyo Chemical Industries, Ltd.), LEOCON GP-250 (average molecular weight 250), LEOCON GP-300 (average molecular weight 300), LEOCON GP-400 (average molecular weight 400), LEOCON GP-700 (average molecular weight 700) (all trade names, manufactured by LION Corporation), and polypropylenetriol glycol.triol types (average molecular weight 300, and average molecular weight 700) (all manufactured by Wako Pure Chemical Ind., Ltd.).

One kind of the water-soluble organic solvents can be used alone, or two or more kinds of them may be used as a mixture. The combination for the mixture is not particularly limited, but when an alkylene oxide adduct of glycerol represented by Structural Formula (1) above and an alkylene glycol alkyl ether (preferably, di- or tri-alkylene glycol monoalkyl ether (in which the alkyl portion preferably has from 1 to 4 carbon atoms)) having an SP value of 23 or lower (preferably, an SP value of 22 or lower) are used in combination, the fixability may be further improved and blocking of images can be effectively suppressed. In this case, the mixing ratio (a:b) of the (a) alkylene oxide adduct of glycerol represented by Structural Formula (1) above and the (b) alkylene glycol alkyl ether having an SP value of 23 or lower is preferably in a range of from 1:5 to 5:1, and more preferably in a range of from 1:2.5 to 2.5:1, based on the reasons as described above.

The content of the water-soluble organic solvent(s) in the ink composition is preferably less than 20% by mass relative to the total mass of the composition. In a case in which high speed recording is performed using, for example, a single pass method, the content of the water-soluble organic solvent(s) of lower than 20% by mass may be advantageous for performing treatment, such as drying, fixing, or the like after recording, in a short time, and the occurrence of blocking and offset can be effectively suppressed.

In particular, the content of the water-soluble organic solvent(s) is more preferably 5% by mass or more but lower than 20% by mass, and more preferably from 7% by mass to 17% by mass, relative to the total mass of the composition.

2-Pyrrolidone

The ink composition of the present invention preferably contains 2-pyrrolidone.

2-Pyrrolidone functions as a wetting agent, and by the inclusion of 2-pyrrolidone, the penetration properties may be improved, and thus, 2-pyrrolidone has a function of enlarging the dot diameter of ink droplets spotted onto the recording medium. For instance, in the case of using inks of plural colors to form a multicolor image, or in the case of further spotting an ink droplet on another ink droplet that has been spotted, thereby forming an image, 2-pyrrolidone is useful for suppressing the occurrence of streak defects or defects of regions missing color in the background image, which is formed by using liquid droplets of the first color or liquid droplets formed in advance and on which ink is further spotted, thereby forming an image with favorable color reproducibility.

The content of 2-pyrrolidone in the ink composition is preferably from 0.5% by mass to 15% by mass, and more preferably from 0.5% by mass to 10% by mass, in terms of imparting penetration properties to ink and giving a function of enlarging the liquid droplet diameter (dot diameter) of ink to a desired extent. The content of 2-pyrrolidone in the ink composition is particularly preferably from 0.5% by mass to 6% by mass from the viewpoint of realizing both the function of enlarging the dot diameter and scratch resistance of the image.

Wax

The ink composition of the present invention preferably contains poorly-water-soluble wax particles selected from the group consisting of paraffin wax and derivatives thereof, carnauba wax, and mixtures thereof. By the inclusion of the poorly-water-soluble wax, the scratch resistance of the image may be further improved.

The wax particles may be contained together with resin particles. In the case of containing the wax particles together with the resin particles, it is preferable to use PVP, PVA, or PEG, which are described below, in combination, from the viewpoint of suppressing the ink from being easy to adhere and deposit. By the inclusion of one selected from of PVP, PVA, and PEG, it is possible to suppress ejection deviation and non-ejection.

Here, the term "poorly-water-soluble" wax particles as used above refers to wax particles whose dissolution amount is 15 g or less, when the wax is dried at 105° C. for 2 hours, and then dissolved in 100 g of water at 25° C. From the viewpoint of improving the continuous ejection property and ejection stability of the ink, the dissolution amount is preferably 5 g or less, and more preferably 1 g or less.

Examples of the wax may include natural wax and synthetic wax.

Examples of the natural wax include petroleum-derived waxes, vegetable-derived waxes, and vegetable and animal derived waxes.

Examples of the petroleum-derived waxes may include paraffin wax, microcrystalline wax, and petrolatum. Examples of the vegetable-derived waxes may include carnauba wax, candelilla wax, rice wax, and Japan tallow. Examples of the vegetable and animal derived waxes may include lanolin and beeswax.

Examples of the synthetic wax include synthetic hydrocarbon waxes and modified waxes.

Examples of the synthetic hydrocarbon waxes include polyethylene waxes and Fisher-Tropsch waxes. Examples of the modified waxes may include paraffin wax derivatives, montan wax derivatives, microcrystalline wax derivatives, and the like, and derivatives thereof.

Among the above waxes, carnauba wax is preferable from the viewpoint of improvement in scratch resistance of the image, and also from the viewpoint of improvement in image strength in the post-processing (processing for producing a booklet or the like) of image samples. Further, paraffin wax and derivatives thereof, which include hydrocarbon having from 20 to 40 carbon atoms as the main component, are preferable in view of being excellent in feeling of image gloss, prevention of moisture vaporization from the nozzle tip, and moisture retention effect.

Further, since polyethylene wax exhibits excellent compatibility with resin, polyethylene wax is preferable in view of ease of forming uniform and favorable images. Furthermore, polyethylene wax is easily modified, and glycol-modified polyethylene wax that is obtained by modifying the polyethylene wax is more preferable, since wettability originating from glycol can be imparted, and therefore, the effect in terms of wettability of the ink composition can be demonstrated at the nozzle tip and, as a result, ejection stability can be realized more effectively.

The wax is preferably added in the form of a dispersion, and water is preferably used as the solvent of the dispersion, but the invention is not limited thereto. For example, an ordinary organic solvent may be selected as appropriate and used at the time of dispersion. For the organic solvent, description in paragraph 0027 of JP-A No. 2006-91780 can be referred to.

The content of the wax in the ink composition is preferably from 0.1% by mass to 5% by mass, more preferably from 0.5% by mass to 4% by mass, and even more preferably from 0.5% by mass to 3% by mass, relative to the total mass of the ink. When the content of the wax is 0.1% by mass or higher, the scratch resistance of the image may be further improved. The content being 5% by mass or lower is advantageous in view of long-term storage stability of ink. From the viewpoint of ejection stability over a long-term, it is preferable that the content is from 0.5% by mass to 3% by mass.

(PVP, PVA, or PEG)

The ink composition of the present invention contains one or two or more selected from the group consisting of polyvinyl pyrrolidone (PVP), polyvinyl alcohol (PVA), and polyethylene glycol (PEG). By the inclusion of PVP or the like in the ink composition, even in a case in which the ink composition includes resin particles or wax particles (preferably, both resin particles and wax particles), deposition of firmly adhered substances of ink in the vicinity of nozzle holes may be less likely to occur, and even when ink is adhered, removing by wiping or the like may become easier. Therefore, in a usage form in which the ink composition is used while repeating ejection of ink and temporary suspension of ejection, ejection deviation and non-ejection of ink may be suppressed, and as a result, ink ejection properties may become stable and, further, desired high resolution may be stably formed. This effect may be especially excellent in the case of forming an image by ejecting ink from an ejection head which is equipped with a film containing a silicon atom (for example, a film of silicone or an oxide thereof (for example, an $SiO_2$ film)) on the surface of the interior of the nozzle holes.

It is preferable that PVP, PVA, and PEG are contained in an amount within the range of 0.01% by mass or higher but lower than 1.00% by mass, relative to the total mass of the ink composition. By the inclusion of the PVP or the like in such a relatively small amount, the ink ejection property and image formability can be improved without increasing the viscosity of the ink. In other words, the content of PVP or the like of 0.01% by mass or higher relative to the total mass of the ink composition is effective for the suppression of separation and deposition of resin particles or wax particles. When the content of PVP or the like is lower than 1.00% by mass relative to the total mass of the ink composition, adhesion of ink caused by excessive addition is less likely to occur, and thickening is suppressed, and thus, favorable ejection properties may be maintained and image formation in which the occurrence of defects such as regions missing color or the like is suppressed may be performed.

In particular, from the viewpoint of prevention of ejection deviation and non-ejection of ink when ejection is restarted after temporary suspension of ejection (specifically, from the viewpoints of prevention of defects of regions missing color and improvement in droplet deposition position accuracy), the content of PVP or the like is preferably from 0.01% by mass to 0.5% by mass, relative to the total mass of the ink composition. Further, from the viewpoint of securing ejection stability over a long-term, the content of PVP or the like is more preferably from 0.025% by mass to 0.5% by mass, even more preferably from 0.05% by mass to 0.2% by mass, and particularly preferably from 0.05% by mass to 0.1% by mass, relative to the total mass of the ink composition.

The "PVA" in the present invention further includes in its scope modified polyvinyl alcohols which are modified with, for example, acetoacetyl group, a carboxyl group, an anionic group such as a hydroxyl group, or a silanol group.

Water

The ink composition in the present invention includes water, but the amount of water is not particularly limited. In particular, in terms of securing stability and ejection reliability, the amount of water is preferably from 10% by mass to 99% by mass, more preferably from 30% by mass to 80% by mass, and even more preferably from 50% by mass to 70% by mass, relative to the total mass of the ink composition.

Other Components

The ink of the present invention may further include a surfactant other than the above-described nonionic surfactants and/or one or more of various additives, in addition to the components described above. Examples of the various additives include known additives such as an ultraviolet absorbent, a fading preventing agent, an anti-mold agent, a pH adjusting agent, an anti-rust agent, an antioxidant, an emulsion stabilizer, a preservative, an antifoaming agent, a viscosity adjusting agent, a dispersion stabilizer, or a chelating agent.

—Surfactant—

For the purpose of, for example, maintaining ejection properties of the ink composition, the ink composition of the present invention may include a surfactant other than the above-described nonionic surfactants, if necessary. The surfactant may be used as a surface tension adjusting agent. As the surface tension adjusting agent, a compound having a structure in which a hydrophilic moiety and a hydrophobic moiety are contained in the molecule is preferred, and any of anionic surfactants, cationic surfactants, amphoteric surfactants, nonionic surfactants, and betaine surfactants may be used. Further, the dispersant described above (polymeric dispersant) may also be used as a surfactant.

In a case in which the ink composition contains a surfactant, it is preferable that the surfactant is contained in such an amount that the surface tension of the ink composition may be adjusted to be within a range of from 20 mN/m to 60 mN/m, in view of performing the ejection of the ink satisfactorily by an ink-jet method, and from the viewpoint of surface tension, the surfactant is more preferably contained in such an amount that the surface tension of the ink composition may be adjusted to be within a range of from 20 mN/m to 45 mN/m, and even more preferably within a range of from 25 mN/m to 40 mN/m. The specific amount of the surfactant in the ink composition is not particularly limited, and may be an amount by which a surface tension may be in the preferable range. The amount of the surfactant(s) is preferably 1% by mass or more, more preferably from 1% by mass to 10% by mass, and even more preferably from 1% by mass to 3% by mass.

The total solid content (by mass) of the ink composition of the present invention is preferably 10% by mass or higher. With the total solid content of 10% by mass or higher, in a case in which high speed recording is performed using, for example, a single pass method or the like, treatment such as drying, fixing, or the like after recording is conducted in a short time, and therefore, when a recording medium is stacked on an image that has been recorded, the image portion is less likely to transfer (blocking) to the back surface of the recording medium stacked on the image and, for example, when an image is brought into contact with a member such as a roller or the like after recording to fix the image, the image is less likely to transfer to the roller or the like, whereby stains on the roller or image defects (offset) are less likely to be caused.

In the present invention, from the viewpoint of effectively preventing the occurrence of blocking or offset, the upper limit of the total solid content (by mass) is preferably 20% by mass. In particular, the total solid content is particularly preferably in a range of from 10.5% by mass to 15% by mass, based on the reasons described above.

The term "solid content" in the present invention refers to the total mass of the pigment(s), the pigment dispersant(s), and the resin particles.

—Properties of Ink—

The surface tension (at 25° C.) of the ink composition is preferably from 20 mN/m to 60 mN/m. More preferably, the surface tension is from 20 mN/m to 45 mN/m, and even more preferably from 25 mN/m to 40 mN/m. The surface tension of the ink is measured under the conditions of a temperature of 25° C. using AUTOMATIC SURFACE TENSIOMETER CBVP-Z (trade name, manufactured by Kyowa Interface Science Co., Ltd.). The viscosity at 25° C. of the ink composition is preferably from 1.2 mPa·s to 15.0 mPa·s, more preferably 2 mPa·s or more but less than 13 mPa·s, and even more preferably 2.5 mPa·s or more but less than 10 mPa·s. The viscosity of the ink composition is measured under the conditions of a temperature of 25° C. using VISCOMETER TV-22 (trade name, manufactured by Toki Sangyo Co., Ltd.).

The ink composition of the present invention may be used as an ink-jet ink, and may be used for recording color images. For example, in the case of forming a full color image, the ink composition of the invention is preferably used as a magenta tone ink, a cyan tone ink, or a yellow tone ink. Further, for adjusting the color tone, the ink composition of the invention may be used as a black tone ink. Moreover, the ink composition of the invention can be used as a red, green, blue, or white ink, other than the yellow, magenta, and cyan tone inks, or a so-called special color ink in the printing field, or the like.

<Ink Set>

The ink set of the present invention includes the above-described ink composition of the present invention and a treatment liquid including an aggregating component that causes formation of an aggregate when contacting the ink composition. Since the ink set of the present invention includes the ink composition described above, the reduction in liquid droplet diameter (dot diameter) of spotted ink may be suppressed, while maintaining favorable ejection properties, and thus an image with excellent image quality and excellent color reproducibility may be formed.

Details and preferable embodiments of the constituent components and physical properties of the ink composition are as described above.

The treatment liquid according to the present invention is an aqueous composition capable of causing formation of an aggregate when contacting the ink composition. Specifically, the treatment liquid according to the invention includes at least an aggregating component which, when mixed with the ink composition, can aggregate dispersed particles such as colored particles (a pigment or the like) in the ink composition, thereby forming an aggregate. The treatment liquid may further include other components, if necessary. By using the treatment liquid together with the ink composition, ink-jet recording may be speeded up, and even when high speed recording is performed, an image having high density and high resolution may be obtained.

The treatment liquid includes at least one aggregating component capable of causing formation of an aggregate when contacting the ink composition. The aggregating component is a substance that causes formation of an aggregate by aggregating the components (for example, dispersed components such as a pigment, resin particles, wax particles, or the like) in the above ink composition, and may be selected without any limitation from among the compounds that can cause aggregation of the components in the ink composition.

Examples of the aggregating component may include compounds capable of changing the pH of the ink composition, polyvalent metal salts, and cationic compounds. In the present invention, compounds capable of changing the pH of the ink composition are preferable from the viewpoint of aggregation properties of the ink composition, and compounds capable of reducing the pH of the ink composition are more preferable.

Examples of the compounds capable of reducing the of the ink composition may include acidic substances.

Preferable examples of the acidic substances include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives of the compounds, and salts thereof.

In particular, acidic substances having high water-solubility are preferable. From the viewpoint of fixing the whole ink by reacting with the ink composition, acidic substances having a valency of three or less are preferable, and acidic substances having a valency of from two to three are particularly preferable. One kind of the acidic substances may be used alone, or two or more kinds of them may be used in combination.

In a case in which the treatment liquid in the present invention contains an acidic substance, the pH (at 25° C.) of the treatment liquid is preferably from 0.1 to 6.0, more preferably from 0.5 to 5.0, and even more preferably from 0.8 to 4.0.

Examples of the polyvalent metal salt may include salts of any of alkaline earth metals belonging to Group II of the periodic table (e.g., magnesium or calcium), transition metals belonging to Group III of the periodic table (e.g., lanthanum), cations of elements belonging to Group XIII of the periodic table (e.g., aluminum), and lanthanides (e.g., neodymium). As salts of the metals, carboxylic acid salt (formate, acetate, benzoate, or the like), nitrate, chlorides, and thiocyanate are preferable. In particular, calcium salts or magnesium salts of carboxylic acids (formate, acetate, benzoate, or the like), calcium salts or magnesium salts of nitric acid, calcium chloride, magnesium chloride, and calcium salts or magnesium salts of thiocyanic acid are preferable.

The cationic compound may be, for example, preferably a cationic surfactant. Preferred examples of the cationic surfactant include compounds of primary, secondary or tertiary amine salt type. Examples of these amine salt type compounds may include compounds such as hydrochlorides or acetates (for example, laurylamine, palmitylamine, stearylamine, rosin amine, or the like), quaternary ammonium salt type compounds (for example, lauryltrimethylammonium chloride, cetyltrimethylammonium chloride, lauryldimethylbenzylammonium chloride, benzyltributylammonium chloride, benzalkonium chloride, or the like), pyridinium salt type compounds (for example, cetylpyridinium chloride, cetylpyridinium bromide, or the like), imidazoline type cationic compounds (for example, 2-heptadecenylhydroxyethylimidazoline or the like), and ethylene oxide adducts of higher alkylamines (for example, dihydroxyethylstearylamine or the like). A polyallylamine compound may be used. Further, amphoteric surfactants exhibiting cationic properties in a desired pH region may be used, examples of which include amino acid type amphoteric surfactants, R—NH—$CH_2CH_2$—COOH type compounds (in which R represents an alkyl group or the like), carboxylic acid salt type amphoteric surfactants (for example, stearyldimethylbetaine, lauryldihydroxyethylbetaine, or the like), amphoteric surfactants of sulfuric acid ester type, sulfonic acid type, phosphoric acid ester type, or the like.

One kind of the aggregating components may be used alone, or two or more kinds of them may be used in combination.

The content of the aggregating component(s) for aggregating the ink composition in the treatment liquid is preferably from 1% by mass to 50% by mass, more preferably from 3% by mass to 45% by mass, and even more preferably from 5% by mass to 40% by mass.

When at least one of an acidic substance or a cationic compound is used in combination with the polyvalent metal compound, the content of the acidic substance and the cationic compound (total content of the acidic substance and the cationic compound) in the treatment liquid is preferably from 5% by mass to 95% by mass, and more preferably from 20% by mass to 80% by mass, relative to the total content of the polyvalent metal compound.

The treatment liquid according to the present invention may contain, in general, a water-soluble organic solvent in addition to the aggregating component, and may also contain one or more of various other additives. Details of the water-soluble organic solvent and the various other additives are similar to those for the ink composition.

The surface tension (at 25° C.) of the treatment liquid is preferably from 20 mN/m to 60 mN/m. More preferably, the surface tension is from 25 mN/m to 50 mN/m, and even more preferably from 25 mN/m to 45 mN/m. The surface tension of the treatment liquid is measured under the conditions of a temperature of 25° C. using AUTOMATIC SURFACE TENSIOMETER CBVP-Z (trade name, manufactured by Kyowa Interface Science Co., Ltd.).

<Image Forming Method>

Next, an image forming method of the present invention is described.

The image forming method of the present invention includes a process of ejecting the above-described ink composition of the present invention or an ink composition in the above-described ink set of the present invention by an ink-jet method to a recording medium from an ejection head having plural nozzle holes that eject liquid droplets (hereinbelow, may also be referred to as an "ink application process"). The image forming method of the present invention may further include one or more additional processes such as a process of thermally fixing the formed image (hereinbelow, may also be referred to as a "thermal fixing process"), a process of applying a treatment liquid to the recording medium (hereinbelow, may also be referred to as a "treatment liquid application process"), or the like.

In the image forming method in the present invention, since recording is performed using the above-described ink composition of the present invention, the frequency of the occurrence of defects such as streak-like defects or defects of regions missing color due to reduction in dot diameter is reduced and, as a result, images having excellent image quality and excellent color reproducibility may be provided.

—Ink Application Process—

In the ink application process, the above-described ink composition of the present invention is ejected by an ink-jet method to record an image on a recording medium.

Image recording by utilizing the ink-jet method can be performed by supplying energy, thereby ejecting an ink composition to a recording medium, to form a colored image. In the image forming method of the present invention, for example, a method described in paragraphs 0093 to 0105 in JP-A No. 2003-306623 may be used as a preferable method.

The ink-jet method is not particularly limited and may be of any known system, for example, a charge control system of ejecting an ink by utilizing an electrostatic attraction force, a drop on demand system (pressure pulse system) of utilizing a vibration pressure of a piezo element, an acoustic ink-jet system of converting electric signals into acoustic beams, irradiating them to an ink, and ejecting the ink by utilizing a radiation pressure, and a thermal ink-jet system of heating an ink to form bubbles and utilizing the resultant pressure. As the ink-jet method, for example, an ink-jet method described in JP-A No. 54-59936 in which an ink is ejected by acting force caused by volume change of ink can be used.

It is preferable to wash and get the pathway that supplies ink into the head wet with a liquid having a low surface tension in advance, before applying ink to the ink-jet head, in view of introducing ink into the head without involving bubbles or the like. Further, it is possible to use the same liquid for the purpose of washing the head before stopping for a long-term, or to use as a moisturizing liquid in order to prevent drying and solidifying the ink on the surface of the head. To this liquid having a low surface tension, it is preferable to add a surfactant to decrease the surface tension, and it is preferable to add a surfactant selected from the ethylene oxide adducts of acetylene glycol, which are represented by Formula (1) in the present invention. The addition amount is preferably from 0.5 times to twice the amount of the critical micelle concentration (CMC) of the surfactant, and particularly preferably from 0.8 times to 1.5 times the amount of the CMC of the surfactant. Further, it is preferable to add an antiseptic, and it is particularly preferable to add benzoisothiazolin-3-one. Furthermore, it is preferable to add a pH buffer, and it is preferable to adjust the pH to be within the range of from 6.0 to 9.0, and more preferably from 7.0 to 8.0. It is preferable to use imidazole, Tris, sodium dihydrogen carbonate, or disodium hydrogen phosphate, as the buffer, and to adjust the pH to the above pH using an acid such as nitric acid, sulfuric acid, or hydrochloric acid.

In the ink application process, for example, in forming an image, a recording medium conveying speed may be varied. The recording medium conveying speed is not particularly limited as long as the image quality is not impaired. The recording medium conveying speed is preferably, from 100 mm/s to 3,000 mm/s, more preferably from 150 mm/s to 2,700 mm/s, and even more preferably from 250 mm/s to 2,500 mm/s.

The recording medium is not particularly limited. As a recording medium, for example, a coated paper, which is used in general offset printing or the like, may be used.

The coated paper is a product obtained by applying a coating material on the surface of a high quality paper, a neutral paper, or the like, which is mainly made of cellulose and is generally not surface-treated, to provide a coating layer. In general, conventional image formation involving aqueous ink-jet ink using a coated paper as a recording medium may easily cause problems in the product quality, such as bleeding of image or low scratch resistance. However, in the image forming method of the invention, the image bleeding may be suppressed, and the generation of density unevenness may be prevented so that images with density uniformity can be formed, and images having favorable blocking resistance, offset resistance, and scratch resistance may be recorded. As the coated paper, those which are commercially available may be used. For example, a coated paper for general printing may be used, and specific examples thereof include coat papers (A2, B2) such as "OK TOPCOAT PLUS" manufactured by Oji Paper Co., Ltd., "AURORACOAT" and "U-LITE" manufactured by Japan Paper Group, Inc.; and an art paper (A1) such as "TOKUBISHI ART" manufactured by Mitsubishi Paper Mills, Ltd.

—Treatment Liquid Application Process—

The image forming method of the present invention preferably further includes a process of applying, onto a recording medium (preferably, a coated paper), a treatment liquid that causes formation of an aggregate by aggregating the components in the ink composition, when the treatment liquid is brought into contact with the ink composition (treatment liquid application process), from the viewpoints of improving blocking resistance and offset resistance of the images, in addition to further improving the scratch resistance of the images. When the image recording using the ink composition is performed in the presence of the treatment liquid, the occurrence of curling and cockling after image formation may be suppressed, the occurrence of ink cissing may also be suppressed, and images having favorable blocking resistance and offset resistance in addition to scratch resistance may be obtained.

In regard to the application of the treatment liquid on a coated paper, a known liquid application method may be used without any particular limitation, and any method may be selected. Examples of the method include spray coating, coating with a coating roller or the like, application by an ink-jet system, and dipping. Specific examples of a liquid application method include size press methods, knife coater methods, roll coater methods, blade coater methods, bar coater methods, cast coater methods, gravure coater method, curtain coater methods, die coater methods, brush coater methods, and transfer methods. Furthermore, a method of coating in which the coating amount is controlled using a coating apparatus equipped with a liquid amount controlling member, as in the case of the coating apparatus described in JP-A No. 10-230201, may also be used.

The treatment liquid may be applied over the entire surface of the recording medium (coated paper). Alternatively, the treatment liquid may be applied to a region where ink-jet recording is performed in the subsequent ink application process. According to the invention, in view of uniformly adjusting the amount of application of the treatment liquid, uniformly recording fine lines, fine image portions or the like, and suppressing density unevenness such as image unevenness, it is preferable that the treatment liquid is applied over the entire surface of the coated paper by coating the liquid using a coating roller or the like. As for the method of coating the treatment liquid while controlling the amount of application of the aggregating component to the above-described range, for example, a method of using an anilox roller may be described. The anilox roller is a roller in which the roller surface, being thermal spray coated with ceramics, is processed with laser and provided with a pattern of a pyramidal shape, a slant-lined shape, a hexagonal shape, or the like on the surface. The treatment liquid goes into the depression areas provided on this roller surface, and when the roller surface contacts the paper surface, transfer occurs, and the treatment liquid is coated in an amount that is controlled at the depressions of the anilox roller.

—Thermal Fixing Process—

In the thermal fixing process, the images recorded in the ink application process are fixed by thermal fixing. The fixing of images can be performed by pressing a pressing member against the inks that form the image portion on a recording medium. In the present invention, an offset phenomenon in which images (ink composition) transfer to the pressing member thereby deteriorating the images when the pressing member is brought into contact with the images can be suppressed, and the image fixation can be rapidly performed while maintaining the image quality. Thus, images having favorable texture such as glossiness of images or the like, favorable scratch resistance (for example, adhesion with paper), and excellent image quality can be recorded at a high speed.

The fixing of image portions may be performed as follows. For example, after the ink application process, a pressure application process may be provided, in which a pressure application means that applies pressure at least to the image is used, and this pressure application means is pressed against the image portion to fix (fixation treatment) the image portion by application of pressure. Alternatively, after the ink application process, a heating and pressure application process may be provided in which the image portion is fixed (fixation treatment) by application of pressure and heat, using a heating means in combination with the pressure application means. Examples of the pressure application means include a pair of rolls that are pressed against each other and a pressure plate. Examples of the heating means include a heating roller and a heating plate. Specifically, for example, after the ink application process, the surface of the recording medium may be pressed using a heating roller or a heating plate which has been heated. In this case, the resin particles contained in the inks may be melted. The heating temperature in this process is preferably higher than the Tg of the resin particles in the ink composition.

EXAMPLES

Hereinafter, the present invention will be specifically described with reference to Examples, but the present invention is not limited to the following Examples unless exceeds the subject matter of the invention. Unless stated otherwise, "parts" represents parts by mass.

Here, the weight average molecular weight was measured by gel permeation chromatography (GPC) and is expressed in terms of polystyrene. For the GPC, HLC-8020 GPC (trade name, manufactured by Tosoh Corporation) was used, and TSK GEL SUPER HZM-H, TSK GEL SUPER HZ4000, and TSK GEL SUPER HZ200 (all trade names, manufactured by Tosoh Corporation) were used as columns, and THF (tetrahydrofuran) was used as an eluent.

—Synthesis of Polymeric Dispersant P-1—

88 g of methyl ethyl ketone were added to a 1000 mL three-necked flask equipped with a stirrer and a condenser tube, and were heated to 72° C. under a nitrogen atmosphere. To this, a solution obtained by dissolving 0.85 g of dimethyl 2,2'-azobis(isobutyrate), 60 g of benzyl methacrylate, 10 g of methacrylic acid, and 30 g of methyl methacrylate in 50 g of methyl ethyl ketone was added dropwise over 3 hours. After the dropwise addition was completed, the mixture was reacted for an additional one hour, and then a solution obtained by dissolving 0.42 g of dimethyl 2,2'-azobis(isobutyrate) in 2 g of methyl ethyl ketone was added thereto. The temperature was raised to 78° C., and the mixture was heated for 4 hours. The resulting reaction liquid was reprecipitated twice in an excess amount of hexane, and the separated resin was dried to obtain 96 g of a polymeric dispersant P-1.

The composition of the obtained resin was confirmed by $^1$H-NMR. The weight average molecular weight (Mw) thereof as determined by GPC was 44,600. Further, the acid value thereof was determined by the method described in JIS Standards (JIS K0070: 1992), and was found to be 65.2 mgKOH/g.

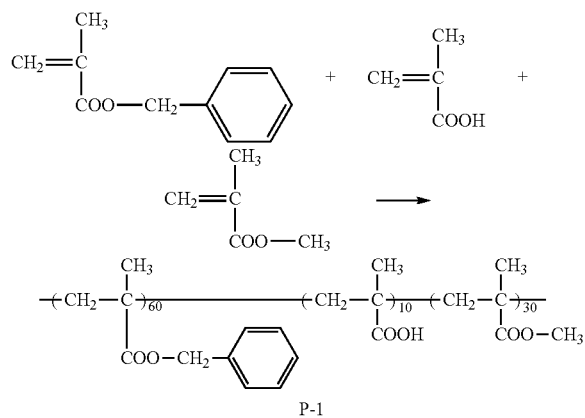

mol/L NaOH aqueous solution, and 87.2 parts of ion exchanged water were mixed, and the resulting mixture was subjected to dispersion for a period of from 2 hours to 6 hours using a bead mill with zirconia beads having a diameter of 0.1 mm. Subsequently, from the resulting dispersion, the methyl ethyl ketone was removed under reduced pressure at 55° C., and further a portion of water was removed to obtain a resin-coated cyan pigment dispersion (encapsulated pigment) having a pigment concentration of 15.0% by mass.

(2) Resin-Coated Magenta Pigment Dispersion

Preparation of a resin-coated magenta pigment dispersion was conducted in a manner substantially similar to that in the preparation of the resin-coated cyan pigment dispersion, except that CHROMOPHTHAL JET MAGENTA DMQ (trade name, manufactured by BASF Japan Ltd.; Pigment Red 122) was used in place of Pigment Blue 15:3 used as the pigment in the preparation of the resin-coated cyan pigment dispersion.

(3) Resin-Coated Yellow Pigment Dispersion

Preparation of a resin-coated yellow pigment dispersion was conducted in a manner substantially similar to that in the preparation of the resin-coated cyan pigment dispersion, except that IRGALITE YELLOW GS (trade name, manufactured by BASF Japan Ltd.; Pigment Yellow 74) was used in place of Pigment Blue 15:3 used as the pigment in the preparation of the resin-coated cyan pigment dispersion.

(4) Resin-Coated Black Pigment Dispersion

The components in the composition described below were mixed, and the resulting mixture was subjected to dispersion for a period of from 3 hours to 6 hours using a bead mill with zirconia beads having a diameter of 0.1 mm. Subsequently, from the resulting dispersion, the methyl ethyl ketone was removed under reduced pressure at 55° C., and further a portion of water was removed, to prepare a resin-coated black pigment dispersion having a carbon black concentration of 15% by mass.

<Composition of Resin-Coated Black Pigment Dispersion>

| | |
|---|---|
| Carbon black (trade name: NIPEX 180-IQ, manufactured by Evonik-Degussa GmbH) | 10.0 parts |
| Polymeric dispersant P-1 described above | 4.5 parts |
| Methyl ethyl ketone (organic solvent) | 30.5 parts |
| 1 mol/L NaOH aqueous solution (neutralizing agent) | 6.3 parts |
| Ion exchanged water | 98.7 parts |

(5) Resin-Coated Black Pigment Dispersion 2

The pigment dispersions were mixed so as to have the following composition, thereby preparing resin-coated black pigment dispersion 2 (expressed as "Black 2" in the tables described below).

| | |
|---|---|
| Resin-coated black pigment dispersion | 100.0 parts |
| Resin-coated cyan pigment dispersion | 33.3 parts |
| Resin-coated magenta pigment dispersion | 46.0 parts |

—Preparation of Resin Particles—

Synthesis of Self-Dispersing Polymer B-1

540.0 g of methyl ethyl ketone were placed in a 2 L three-necked flask equipped with a stirrer, a thermometer, a reflux condenser tube, and a nitrogen gas inlet tube, and were heated to a temperature of 75° C. While maintaining the temperature —Preparation of Resin-Coated Pigment Dispersion—

(1) Resin-Coated Cyan Pigment Dispersion 10 parts of Pigment Blue 15:3 (trade name: PHTHALO-CYANINE BLUE A220, manufactured by Dainichiseika Color & Chemicals Mfg. Co., Ltd.), 5 parts of the polymeric dispersant P-1, 42 parts of methyl ethyl ketone, 5.5 parts of 1 inside the reaction vessel at 75° C., to this reaction vessel, a mixed solution of 108 g of methyl methacrylate, 388.8 g of isobornyl methacrylate, 43.2 g of methacrylic acid, 108 g of methyl ethyl ketone, and 2.16 g of "V-601" (trade name, manufactured by Wako Pure Chemical Industries, Ltd.) was added dropwise at a constant speed such that the addition was completed in two hours. After completion of the dropwise addition, a solution of 1.08 g of "V-601" and 15.0 g of methyl ethyl ketone was added thereto, followed by stirring at 75° C. for two hours. Then, a solution of 0.54 g of "V-601" and 15.0 g of methyl ethyl ketone was further added thereto, followed by stirring at 75° C. for two hours. Thereafter, the temperature inside the reaction vessel was elevated to 85° C. and stirring was further continued for two hours. In this way, a resin solution containing a methyl methacrylate/isobornyl methacrylate/methacrylic acid (=20/72/8 [mass ratio]) copolymer was obtained.

The obtained copolymer had a weight average molecular weight (Mw) of 61,000 and an acid value of 52.1 mgKOH/g.

Subsequently, 588.2 g of the resin solution were weighed out, to which, then 165 g of isopropanol and 120.8 mL of a 1 mol/L NaOH aqueous solution were added, and then the temperature inside the reaction vessel was elevated to 80° C. Next, 718 g of distilled water were added thereto dropwise at a rate of 20 mL/min to form an aqueous dispersion. Thereafter, under atmospheric pressure, the temperature inside the reaction vessel was kept at 80° C. for 2 hours, then at 85° C. for 2 hours, and then at 90° C. for 2 hours, to distill off the solvent. Then, the pressure inside the reaction vessel was reduced to further distill off the isopropanol, methyl ethyl ketone, and distilled water, thereby obtaining an aqueous dispersion of self-dispersing polymer B-1 (resin particles) having a solids concentration of 26.0% by mass.

The glass transition temperature of the self-dispersing polymer B-1 was measured according to the following method, and the measured Tg was found to be 180° C.

<Measured Tg>

The aqueous dispersion of the self-dispersing polymer B-1 in an amount of 0.5 g in terms of solid content was dried under reduced pressure at 50° C. for 4 hours to obtain a polymer solid fraction. The obtained polymer solid fraction was used to measure Tg by a differential scanning calorimeter (DSC) EXSTAR6220 (trade name) manufactured by SII NanoTechnology Inc. The measurement conditions were such that 5 mg of a sample was sealed in an aluminum pan, and the value of the peak top of DSC from the measurement data obtained at the time of second temperature elevation in the following temperature profile under a nitrogen atmosphere was designated as Tg.

from 30° C. to −50° C. (cooled at a rate of 50° C./min)
from −50° C. to 120° C. (heated at a rate of 20° C./min)
from 120° C. to −50° C. (cooled at a rate of 50° C./min)
from −50° C. to 120° C. (heated at a rate of 20° C./min)

Synthesis of Self-Dispersing Polymer B-2 to B-5

Aqueous dispersions of self-dispersing polymer (resin particles) B-2 to B-5 each having the following monomer composition were prepared in a manner substantially similar to that in the preparation of the aqueous dispersion of the self-dispersing polymer B-1, except that the kinds and ratio of monomers were changed. Further, the measured Tg was determined in a manner as described above.

B-2: methyl methacrylate/dicyclopentanyl methacrylate/methacrylic acid copolymer (=40/50/10), measured Tg=130° C.

B-3: methyl methacrylate/dicyclopentanyl methacrylate/methoxypolyethylene glycol methacrylate (n=2)/methacrylic acid copolymer (=54/35/5/6), measured Tg=100° C.

B-4: n-butyl methacrylate/cyclohexyl methacrylate/styrene/acrylic acid copolymer (=30/55/10/5) (measured Tg=86° C.)

B-5: phenoxyethyl acrylate/methyl methacrylate/acrylic acid copolymer (=20/70/10), measured Tg=71° C.

Synthesis of Self-Dispersing Polymer B-6

560.0 g of methyl ethyl ketone were placed in a 2 L three-necked flask equipped with a mechanical stirrer, a thermometer, a reflux condenser tube, and a nitrogen gas inlet tube, and heated to a temperature of 87° C. While maintaining the contents inside the reaction vessel in a refluxed state (thereafter, refluxing was continued until the reaction was completed), to this reaction vessel, a mixture solution of 278.4 g of methyl methacrylate, 243.6 g of isobornyl methacrylate, 58.0 g of methacrylic acid, 108 g of methyl ethyl ketone, and 2.32 g of "V-601" (trade name, manufactured by Wako Pure Chemical Industries, Ltd.) was added dropwise at a constant speed such as to complete the dropwise addition in two hours. After completing the dropwise addition, the resulting mixture was stirred for one hour. Thereafter, an operation including adding a solution of 1.16 g of "V-601" and 6.4 g of methyl ethyl ketone and stirring the resulting mixture for two hours was conducted (hereinafter, this operation is referred to as process (1)). Subsequently, the process (1) was repeated for four times. Then, a solution of 1.16 g of "V-601" and 6.4 g of methyl ethyl ketone was further added, and stirring was continued for 3 hours. After completion of the polymerization reaction, the temperature of the resulting solution was lowered to 65° C. and then, 163.0 g of isopropanol were added thereto and cooled while leaving it standing still. The obtained copolymer had a weight average molecular weight (Mw) of 64,000, an acid value of 65.1 (mgKOH/g), and Tg of 157° C.

Next, the polymer solution thus obtained was weighed by 317.3 g (solids concentration: 41.0% by mass), to which, then 46.4 g of isopropanol, 1.65 g of a 20% by mass aqueous solution of maleic anhydride (water-soluble acidic compound; which corresponds to 0.3% by mass as maleic acid with respect to the amount of the copolymer), and 40.77 g of a 2 mol/L aqueous solution of NaOH (sodium hydroxide) were added, and then the temperature inside the reaction vessel was elevated to 70° C. Subsequently, 380 g of distilled water was added dropwise at a rate of 10 mL/min, to achieve dispersion in water (dispersion process).

Thereafter, the temperature inside the reaction vessel was kept at 70° C. under reduced pressure for 1.5 hours to distill off the isopropanol, methyl ethyl ketone, and distilled water in a total distilled amount of 287.0 g (solvent removing process). Then, 0.278 g (which corresponds to 440 ppm as benzoisothiazoline with respect to the solids content of the polymer) of PROXEL GXL (S) (trade name, manufactured by Arch Chemicals Japan, Inc.) was added to the resultant. Then, filtration was conducted using a filter having a pore size of 1 μm, and the filtrate was collected to obtain an aqueous dispersion of self-dispersing polymer particles B-6 having a solids concentration of 23.2% by mass.

The obtained values for the physical properties of the aqueous dispersion of self-dispersing polymer particles thus obtained were followings: the pH: 7.6, electric conductivity: 440 mS/m, viscosity: 12.3 mPa·s, and volume average particle diameter: 2.5 nm.

—Preparation of Ink—

Using the resin-coated pigment dispersion and the aqueous dispersions of self-dispersing polymer particles B-1 to B-6, each obtained as described above, cyan color, magenta color, yellow color, and black color inks and inks for comparison were prepared so as to have the compositions shown in Table 1 to Table 4 below. In this process, the total solid content of each ink, the solid content ratio of resin particles, Tg, the SP values and amounts of organic solvents, and the like were as shown in Table 1 to Table 4. In Table 3, "Ratio (a)/(b)" indicates the content ratio [(a)/(b); mass ratio] of the (a) nonionic surfactant having an HLB of from 15 to 19 relative to the (b) nonionic surfactant having an HLB of 10 or more but less than 15.

—Preparation of Treatment Liquid—

The components of the following composition were mixed, thereby preparing treatment liquid 1. The pH (at 25° C.) of the treatment liquid 1 was measured using PH METER WM-50EG (trade name, manufactured by DKK-TOA CORPORATION), and was found to be 1.02.

<Composition>

| | |
|---|---|
| Orthophosphoric acid (85% by mass aqueous solution) | 5.0% by mass |
| Malonic acid | 7.0% by mass |
| Malic acid | 7.0% by mass |
| Diethylene glycol | 4% by mass |
| Triethylene glycol monomethyl ether | 4% by mass |
| Ion exchanged water | Remainder |

Using the inks and treatment liquid obtained as described above, images were recorded by the methods shown below (Image Recording (1) and Image Recording (2)), and evaluation was performed.

—Image Recording (1)—

TOKUBISHI ART (trade name; basis weight of 104.7 g/m$^2$) was prepared as the recording medium (coated paper), and a recording apparatus having a structure shown in FIG. 1 was prepared as the ink-jet recording apparatus. This recording apparatus was started, the recording medium was fixed on a hard rubber belt of the apparatus and was conveyed at a conveying speed of 400 mm/sec, and an image was recorded through performing the following processes. Note that, the symbols <I> to <V> in FIG. 1 correspond to the step Ito step V described below, respectively. Thereafter, with regard to the obtained recorded images, the evaluation described below was performed. Results are shown in Tables 5 and 6 described below.

<I. Treatment Liquid Applying Step>

First, the treatment liquid 1 was coated onto the entire surface of the recording medium, using a roll coater, which was equipped with an anilox roller 11 (number of lines: from 100/inch to 300/inch) and with which the coating amount was controlled, so as to give an application amount of 1.2 g/m$^2$.

<II. Treatment Step>

Subsequently, the recording medium that had been coated with the treatment liquid 1 was subjected to drying treatment and penetration treatment, by sending air from a drying fan 21, while heating using a contact-type plane heater 22 from the rear face side of the recording medium (the opposite side from the recorded face), under the conditions described below.

Velocity of air: 10 m/s

Temperature: heating so that the surface temperature of the recorded face of the recording medium becomes 60° C.

<III. Image Forming Step>

Two sets of GELJET GX5000 PRINTER HEAD (trade name, manufactured by Ricoh Co., Ltd.; full line head) were fixed and arranged as shown in FIG. 1, such that the direction of the line head (main scanning direction) where nozzles were arranged was inclined at an angle of 75.7 degree with respect to the direction perpendicular to the moving direction (sub scanning direction) of the endless hard rubber belt. The first ink-jet head 31 and the second ink-jet head 32 were loaded with the cyan, magenta, yellow, and black color inks and the inks for comparison obtained as described above, and the positions of the first ink-jet head 31 and the second ink-jet head 32 were adjusted such that the ink droplets ejected from each head would overlap each other. Thereafter, onto the surface of the recording medium coated with the treatment liquid 1, each ink was ejected in accordance with an ink-jet method under the following conditions, to record a solid image.

Conditions

Ejected liquid droplet amount: 2.4 pL

Resolution: 1200 dpi×1200 dpi

<IV. Ink Drying Step>

Subsequently, the recording medium was belt-transferred to the drying region, and the recording medium to which ink droplets had been adhered was dried under the following conditions by sending air from a drying fan 41, while heating using a contact-type plane heater 42 from the rear face side of the recording medium (the opposite side from the recorded face). Here, immediately after the drying step, the water content of the recording medium in which the image had been recorded was determined by Karl Fischer coulometric titration method using a Karl Fischer water content determination device (CA-200 (trade name), manufactured by Mitsubishi Chemical Analytech Co., Ltd.), and the water content was found to be from about 2.0 g/m$^2$ to about 3.0 g/m$^2$.

Conditions

Method of drying: drying by air blowing

Velocity of air: 15 m/s

Temperature: heating so that the surface temperature of the recorded face of the recording medium becomes 60° C.

<V. Fixing Step>

Next, the image was subjected to thermal fixation treatment by passing through between a pair of fixing rollers including a silicone rubber roller 51 and a large-diameter drum 52, under the following conditions, and the resulting images were collected by being stacked on a collection tray, which is not shown in the FIGURE. Note that, in order to prevent adhesion, a small amount of silicone oil was applied onto the surface of the silicone rubber roller 51.

Conditions

Silicone rubber roller 51: hardness 50°, nip width 5 mm

Roller temperature: 70° C.

Surface temperature of drum 52: 60° C.

Pressure: 0.2 MPa

—Evaluation (1)—

Offset Resistance

An image, in which a solid image formed by using ink ejected from the second ink-jet head 32 was placed on another solid image formed by using ink from the first ink-jet head 31, was formed, and stains on the image surface and stains on the silicone rubber roller 51 were visually observed. Evaluation on offset (color transfer) was made in accordance with the following evaluation criteria. The evaluation results are shown in Table 5 and Table 6 below.

<Evaluation Criteria>

5: Offset is not observed.

4: Offset to a degree of point falling off is observed. The offset is at a level of being hardly visually recognized.

3: Slight offset is observed at a portion. Practically non-problematic.

2: Offset occurs. The offset is at a level of minimum tolerable limit for practical application.

1: Occurrence of offset is remarkable. The offset is at a level having extremely low practicality.

Blocking Resistance

Immediately after forming a solid image by ejecting ink from the first ink-jet head 31, a recording medium on which an image was not formed (the same recording medium as the recording medium on which the image was formed (hereinbelow, referred to as the "unused sample" in the evaluation)) was placed on this solid image, and then a weight of 350 kg/m$^2$ was loaded thereon, and the assembly was further left to stand for 6 hours under an environment of 60° C. and 30% RH. The degree of ink transfer to the background portion of the unused sample was visually observed, and evaluated according to the following evaluation criteria. The evaluation results are shown in Table 5 and Table 6 below.

<Evaluation Criteria>

5: No ink transfer is observed.

4: Ink transfer to a degree of point falling off is observed. The ink transfer is at a level of being hardly visually recognized 3: Slight ink transfer is observed. Practically non-problematic.

2: Ink transfer is observed in some degree. The ink transfer is at a level of minimum tolerable limit for practical application.

1: Ink transfer is remarkable.

Scratch Resistance

A recording medium on which a solid image had been formed by ejecting ink from the first ink-jet head 31 was left to stand still for 24 hours under an environment of 25° C. and 60% RH. Then, a recording medium on which an image was not formed (the same recording medium as the recording medium on which the image was formed (hereinbelow, referred to as the "unused sample" in the evaluation)) was placed on this solid image and rubbed thereagainst ten times with a load of 150 kg/m$^2$. The degree of ink transfer to the background portion of the unused sample was visually observed, and evaluated according to the following evaluation criteria. The evaluation results are shown in Table 5 and Table 6 below.

<Evaluation Criteria>

5: No ink transfer is observed.

4: Ink transfer is hardly noticeable.

3: Slight ink transfer is observed. Practically non-problematic.

2: Ink transfer is observed in some degree.

1: Ink transfer is remarkable.

—Image Recording (2)—

Next, as the ink-jet recording apparatus, an apparatus having the same configuration as that of the ink-jet recording apparatus described in FIG. 1 of JP-A No. 2010-155928 was prepared, and the conditions thereof were set to the setup conditions described below (the symbol in the condition shows the number described in FIG. 1). For the recording head, a fluid executer as described in FIG. 3 of Japanese National Phase Publication No. 2008-544852 was used. This fluid executer has a non-wetting layer containing a fluorocarbon chain on the surface of the nozzle face having ejection holes (the surface of the outside of the holes), and has an SiO$_2$ layer on the surface of the inside of the holes.

<Setup Conditions>

Temperature of ink inside the sub-tank 102: 35° C.

Mesh size of filter 122: 5 μm

Head unit 51: nozzle diameter 18 μm, 1200 dpi, the length of one unit 2 cm

Piezoelectric element 68: lead zirconate titanate (piezo)

Amount of ink that flows through the common channel 52: from 2 mL/sec to 4 mL/sec Before supplying ink to the above recording head, the following channel cleaning liquid was prepared, the channel for supplying ink to the internal of the head was cleaned and was made wet in advance, and the ink was introduced into the interior of the head. It was confirmed that this liquid can clean the head well when it is used as a head cleaning liquid after the completion of the experiment, and it is also possible to use this channel cleaning liquid as a liquid for moisturizing the head surface, while placing a saucer under the head. In this process, the pH of the channel cleaning liquid was 7.4.

<Composition of Channel Cleaning Liquid>

| | |
|---|---|
| OLFINE E1010 (trade name, manufactured by Nissin Chemical Industry Co.) | 1% by mass |
| PROXEL GXL (trade name, manufactured by AVECIA Inc.) | 0.05% by mass |
| Imidazole | 0.002% by mass |
| Nitric acid 67.5% | 0.007% by mass |
| Ion exchanged water | Remainder |

A recording medium (trade name: N SILVER DIA, manufactured by Nippon Paper Industries Co., Ltd.; basis weight: 104.7 g/m$^2$; coated paper (matte)) was fixed on a stage in the ink-jet recording apparatus, the stage being movable at 500 mm/sec in a predetermined linear direction. Then, the treatment liquid obtained as described above was coated thereon using a wire bar coater to give a coating amount of about 5 g/m$^2$, and immediately after coating, dried at 50° C. for 2 seconds. Thereafter, a solid image was drawn as follows: the ink-jet recording apparatus described above was arranged and fixed, and while the recording medium was moved in the sub-scanning direction at a constant speed, each of the inks obtained as described above was ejected in a line system under the ejection conditions of an ink liquid droplet amount of 2.4 pL and a resolution of 1200 dpi×1200 dpi. Immediately after drawing the image, the image was dried at 50° C. for 3 seconds. Subsequently, the resulting recording medium was passed between a pair of fixing rollers heated at 50° C. so as to conduct a fixation treatment at a nip pressure of 0.20 MPa and a nip width of 4 mm. In this manner, a sample for evaluation was obtained.

Here, the fixing rollers are configured by a heating roller composed of a cylindrical metal core which is made of SUS (stainless steel), and which has a halogen lamp therein, and a silicone resin that covers the surface of the cylindrical metal core, and a counter roller that is in pressure contact with the heating roller.

—Evaluation (2)—

Matte Coat Paper Scratch Resistance

Using each of the inks obtained as described above and using the above ink-jet recording apparatus, image output was conducted using (N) SILVER DIA (trade name, manufactured by Nippon Paper Industries Co., Ltd.), which is a matte coat paper, as the recording medium. Immediately after the image output, the surface of the image formed was rubbed with a load of 350 g using an unprinted sheet of the recording medium ((N) SILVER DIA). The presence or absence of stain on the unprinted recording medium that was used for rubbing was visually observed. The degree of stain thus observed was evaluated according to the following criteria. The evaluation results are shown in Table 5 and Table 6 below.

Note that, this test is a test assuming rub of the recording media against each other when the printed recording media are stacked immediately after continuous printing, and occurrence of color transfer between the recording media when the printed matters are handled by workers.

<Evaluation Criteria>
5: Even though the same portion is rubbed five times, color stain is hardly noticeable.
4: Color stain is observed at a noticeable level after the image is rubbed four times.
3: Color stain is observed at a noticeable level after the image is rubbed three times.
2: Color stain is observed at a noticeable level after the image is rubbed twice.
1: Color stain is observed at a noticeable level after the image is rubbed once.

Continuous Ejection Property

Using each of the inks prepared as described above and using the above ink-jet recording apparatus, a line image with a resolution of 75 dpi×24,000 dpi was drawn on a recording medium (trade name: "GASAI SHASHIN SHIAGE PRO", manufactured by Fujifilm Corporation) without applying a treatment liquid, followed by drying. After drying, a fixation treatment of passing the recording medium through fixing rollers was not conducted (which is designated as "printed sample 1".) Thereafter, an ejection operation corresponding to printing of 2,000 sheets was conducted. After the completion of the jection operation, then again, a line image with a resolution of 75 dpi×24,000 dpi was drawn on one sheet of the same recording medium as the recording medium used in the above (which is designated as "printed sample 2"). Further, an ejection operation corresponding to printing of 2,000 sheets was conducted, and then again, a line image with a resolution of 75 dpi×24,000 dpi was drawn on one sheet of the same recording medium as the recording medium used in the above (which is designated as "printed sample 3").

With regard to the printed samples 1 to 3 obtained, the center value of the line was measured using a DOT ANALYZER DA-6000 (trade name, manufactured by Oji Scientific Instruments Co., Ltd.), and a standard deviation $\sigma$ of misalignment from the centerline was calculated. Evaluation was performed in accordance with the following evaluation criteria. The evaluation results are shown in Table 5 and Table 6 below.

<Evaluation Criteria>
5: $\sigma < 1$ μm
4: $1\ \mu m \leq \sigma < 2\ \mu m$
3: $2\ \mu m \leq \sigma < 4\ \mu m$
2: $4\ \mu m \leq \sigma < 6\ \mu m$
1: $\sigma \geq 6\ \mu m$ Recoverability after Leaving Using each of the inks prepared as described above, and using the above ink-jet recording apparatus, an image was drawn on "GASAI SHASHIN SHIAGE PRO" (trade name, manufactured by Fujifilm Corporation) without applying a treatment liquid, followed by drying. A fixation treatment of passing the recording medium through fixing rollers was not conducted. In this manner, a nozzle check pattern image and a line image with a resolution of 75 dpi×24,000 dpi were drawn, respectively on one sheet (which are designated as "initial image samples"). Thereafter, the environment of the recording head nozzle unit was kept at an environment of 25° C. and 50% RH, and the recording head was left for 24 hours. Then, after leaving, the same nozzle check pattern image and line image with a resolution of 75 dpi×24,000 dpi as described above were drawn again, respectively on one sheet of the same recording medium as the recording medium used in the above (which are designated as "image samples after leaving").

With regard to the image samples after leaving which were obtained as described above, nozzle failure (regions missing image) in the nozzle check pattern image was observed using a light microscope, and the ejection ratio was determined. The existence or absence of non-ejection was evaluated in accordance with the evaluation criteria described below.

Note that, the ejection ratio was determined according to the following equation:

$$\text{Ejection ratio (\%)} = \text{(The number of all the ejecting nozzles in the image sample after leaving)}/\text{(The number of all the ejecting nozzles in the initial image sample)} \times 100$$

Further, with regard to each of the line images of the initial image samples and the image samples after leaving, the center value of the line was measured using a DOT ANALYZER DA-6000 (trade name, manufactured by Oji Scientific Instruments Co., Ltd.), and a standard deviation $\sigma$ of misalignment from the centerline was calculated. Evaluation on ejection deviation was performed in accordance with the evaluation criteria described below. The evaluation results are shown in Table 5 and Table 6 below.

—Criteria for Evaluation on Regions Missing Image (Non-Ejection)—
5: The ejection ratio is 100%.
4: The ejection ratio is 99% or higher but lower than 100%.
3: The ejection ratio is 98% or higher but lower than 99%.
2: The ejection ratio is 95% or higher but lower than 98%.
1: The ejection ratio is lower than 95%.

—Criteria for Evaluation on Ejection Deviation—
5: $\sigma < 2$ μm
4: $2\ \mu m \leq \sigma < 4\ \mu m$
3: $4\ \mu m \leq \sigma < 6\ \mu m$
2: $6\ \mu m \leq \sigma < 8\ \mu m$
1: $\sigma \geq 8\ \mu m$ Dot Diameter Change The inks prepared as described above were each placed in a storage container (FUJITAINER (registered trademark), manufactured by FUJIMORI KOGYO CO., LTD.) and stored over time under the following conditions.

Condition 1

Ink is stored under an environment of 45° C. for one month. (Hereinbelow, this operation may be referred to as "thermo-aging condition 1".)

Condition 2

The operation of exposing ink to an environment of 30° C. for 12 hours, and then exposing the ink to an environment of 60° C. for 12 hours is designated as one cycle. Ink is stored under a cycling thermo environment of repeating the cycle (exposing ink to an environment of 30° C. for 12 hours, and then exposing the ink to an environment of 60° C. for 12 hours) for one week. (Hereinbelow, this operation may be referred to as "thermo-aging condition 2".)

Subsequently, a recording medium which had been applied with the above treatment liquid was prepared, and four color-single pass image recording was carried out on the treatment liquid applied face of the recording medium under the following conditions. Note that, the image was changed for every evaluation as described below.

<Conditions>
Head: 1200 dpi/20 inch-width piezo full line head (arranged for four colors)
Ejected liquid droplet amount: 2.4 pL
Drive frequency: 30 kHz (recording medium conveying speed: 635 mm/sec)
Next, the recording medium applied with ink was dried under the following conditions.
<Drying Condition (Air Blowing Drying)>
Velocity of air: 15 m/s
Temperature: heating from the non-recorded face side of the recording medium using a contact type plane heater so that the surface temperature of the recording medium becomes 60° C.
Air blowing region: 640 mm (drying time: for 1 second)
Subsequently, thermal fixation treatment was conducted under the following conditions, whereby a sample of a recording medium on which an image was formed was obtained.
<Thermal Fixation Conditions>
Silicone rubber roller (hardness: 50°, nip width: 5 mm)
Roller temperature: 90° C.
Pressure: 0.8 MPa
The change in secondary color dot diameter was evaluated according to the following method, using the inks before and after thermo-aging.
A solid image of magenta color ink was drawn, and on this image, dots were drawn using the inks of cyan color, yellow color, and black color, to obtain a secondary color dot image by using each of the inks of cyan color, yellow color and black color, on a magenta color solid image.
With regard to 100 secondary color dots obtained, the equivalent circular diameter was measured using a DOT ANALYZER DA-6000 (trade name, manufactured by Oji Scientific Instruments Co., Ltd.), and the average value of 100 dots was designated as the dot diameter.
The change in dot diameter between before and after thermo-aging under the above two conditions (thermo-aging condition 1 and thermo-aging condition 2) was evaluated according to the following evaluation criteria. Note that, the following Δ dot diameter is as described below. The evaluation results are shown in Table 5 and Table 6 below.

Δ Dot diameter=(The value of dot diameter before thermo-aging)−(The value of dot diameter after thermo-aging)

<Evaluation Criteria>
5: Δ Dot diameter is 0 μm or more but less than 0.75 μm.
4: Δ Dot diameter is 0.75 μm or more but less than 1 μm.
3: Δ Dot diameter is 1 μm or more but less than 1.5 μm.
2: Δ Dot diameter is 1.5 μm or more but less than 2 μm.
1: Δ Dot diameter exceeds 2 p.m.
(Curling Property)
The recording medium on which a solid image had been formed such that the application amount of ink was 6 g/m² was cut into a size of 5×50 mm such that the curling direction was the direction of the 50 mm length, to obtain a sample. This sample was left to stand under the conditions of a temperature of 35° C. and a relative humidity of 80%. Then, the curvature C was measured according to the following method, and curling property was evaluated according to the following evaluation criteria. The evaluation results are shown in Table 5 and Table 6 below.
Method for Measuring Curvature
The curvature C of the sample applied with ink was measured under an environment of a temperature of 25° C. and a relative humidity of 50%. The curvature C is represented by the following Equation 1, considering the curl occurred to be an arc having a radius of R. This curvature C is let be an index for evaluating the curling property.

$$C=1/R(m) \qquad \text{Equation 1}$$

<Evaluation Criteria>
5: 10 minutes after the coating, the curvature C of the sample does not exceed 20.
4: One hour after the coating, the curvature C of the sample does not exceed 20.
3: One day after the coating, the curvature C of the sample does not exceed 20.
2: Three days after the coating, the curvature C of the sample exceeds 20.
1: Seven days after the coating, the curvature C of the sample exceeds 20.

TABLE 1

|  | Ink No./Pigment Dispersion | | | |
| --- | --- | --- | --- | --- |
| Ink Composition | 1 Cyan | 2 Cyan | 3 Cyan | 4 Cyan |
| Pigment (*) | 2.5 | 3 | 2.5 | 2.5 |
| Dispersant | 1.1 | 1.3 | 1.1 | 1.1 |
| SANNIX GP250 (manufactured by Sanyo Chemical Industries, Ltd.) SP value: 26.4 | 10 | 10 | 6 | 10 |
| Triethylene Glycol Monomethyl Ether SP value: 20.4 | 2 | 2 | 6 | 3 |
| Dipropylene Glycol SP value: 27.2 | 4 | 4 |  | 5 |
| Glycerin SP value: 33.5 |  |  |  |  |
| Diethylene Glycol SP value: 30.6 |  |  |  |  |
| 2-Pyrrolidone SP value: 27.2 |  |  |  |  |
| PVP,         PVP K15 |  |  |  |  |
| PVA or     (PVP, Mw = 8000 to 10000) |  |  |  |  |
| PEG         PEG 20000 |  |  |  |  |
|                    (PEG, Mw = 20000) |  |  |  |  |
|                    PVA-205 |  |  |  |  |
| Urea | 5 | 5 | 5 | 5 |
| OLFINE E1020 (HLB 15.2) | 1 | 1 | 1 | 1 |
| SURFYNOL 485 (HLB 17) |  |  |  |  |
| Ethylene Oxide Adduct of 2,4,7,9-Tetramethyl-5-decyne-4,7-diol (HLB 19) (addition mole number of ethylene oxide: 50) |  |  |  |  |
| RHEODOL TW-L120 (HLB 16.7) |  |  |  |  |

TABLE 1-continued

|  | | | | |
|---|---|---|---|---|
| OLFINE E1010 (HLB 14) | 0.25 | 0.25 | 0.25 | 0.25 |
| EMULGEN 1108 (HLB 13.4) | | | | |
| NOIGEN ET-106A (HLB 10.9) | | | | |
| NIKKOL PEN4612 (HLB 8.5) | | | | |
| Aqueous Dispersion (*) of Self-Dispersing Polymer | B-1 8 | B-1 6.3 | B-1 8 | B-2 8 |
| Carnauba Wax | | | | |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | |
| Ion Exchanged Water | Remainder | Remainder | Remainder | Remainder |
| Remarks | Invention | Invention | Invention | Inventio |

| | Ink No./Pigment Dispersion | | | |
|---|---|---|---|---|
| Ink Composition | 5 Cyan | 6 Cyan | 7 Cyan | 8 Cyan |
| Pigment (*) | 2.5 | 2.5 | 3 | 2.5 |
| Dispersant | 1.1 | 1.1 | 1.3 | 1.1 |
| SANNIX GP250 (manufactured by Sanyo Chemical Industries, Ltd.) SP value: 26.4 | 10 | 10 | 3.5 | 10 |
| Triethylene Glycol Monomethyl Ether SP value: 20.4 | 3 | 3 | 8 | 2 |
| Dipropylene Glycol SP value: 27.2 | 5 | 5 | | 4 |
| Glycerin SP value: 33.5 | | | 4.5 | |
| Diethylene Glycol SP value: 30.6 | | | | |
| 2-Pyrrolidone SP value: 27.2 | | | | |
| PVP, PVP K15 | | | | |
| PVA or (PVP, Mw = 8000 to 10000) | | | | |
| PEG PEG 20000 | | | | |
| (PEG, Mw = 20000) | | | | |
| PVA-205 | | | | |
| Urea | 5 | 5 | 5 | 5 |
| OLFINE E1020 (HLB 15.2) | 1 | 1 | 1 | |
| SURFYNOL 485 (HLB 17) | | | | 1 |
| Ethylene Oxide Adduct of 2,4,7,9-Tetramethyl-5-decyne-4,7-diol (HLB 19) (addition mole number of ethylene oxide: 50) | | | | |
| RHEODOL TW-L120 (HLB 16.7) | | | | |
| OLFINE E1010 (HLB 14) | 0.25 | 0.25 | 0.35 | |
| EMULGEN 1108 (HLB 13.4) | | | | 0.25 |
| NOIGEN ET-106A (HLB 10.9) | | | | |
| NIKKOL PEN4612 (HLB 8.5) | | | | |
| Aqueous Dispersion (*) of Self-Dispersing Polymer | B-3 8 | B-4 8 | B-1 6.3 | B-1 8 |
| Carnauba Wax | | | | |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | |
| Ion Exchanged Water | Remainder | Remainder | Remainder | Remainder |
| Remarks | Invention | Invention | Invention | Inventio |

| | Ink No./Pigment Dispersion | | | |
|---|---|---|---|---|
| Ink Composition | 9 Cyan | 10 Cyan | 11 Cyan | 12 Cyan |
| Pigment (*) | 2.5 | 2.5 | 2.5 | 2.5 |
| Dispersant | 1.1 | 1.1 | 1.1 | 1.1 |
| SANNIX GP250 (manufactured by Sanyo Chemical Industries, Ltd.) SP value: 26.4 | 10 | 10 | 10 | 10 |
| Triethylene Glycol Monomethyl Ether SP value: 20.4 | 3 | 3 | 3 | 3 |
| Dipropylene Glycol SP value: 27.2 | 5 | 5 | 5 | 5 |
| Glycerin SP value: 33.5 | | | | |
| Diethylene Glycol SP value: 30.6 | | | | |
| 2-Pyrrolidone SP value: 27.2 | | | | |
| PVP, PVP K15 | | | | |
| PVA or (PVP, Mw = 8000 to 10000) | | | | |
| PEG PEG 20000 | | | | |
| (PEG, Mw = 20000) | | | | |
| PVA-205 | | | | |

TABLE 1-continued

| | Ink No./Pigment Dispersion | | | |
|---|---|---|---|---|
| Ink Composition | 9 | 10 | 11 | 12 |

| | | | | |
|---|---|---|---|---|
| Urea | 5 | 5 | 5 | 5 |
| OLFINE E1020 (HLB 15.2) | | 1.25 | 1 | 1 |
| SURFYNOL 485 (HLB 17) | | | | |
| Ethylene Oxide Adduct of 2,4,7,9-Tetramethyl-5-decyne-4,7-diol (HLB 19) (addition mole number of ethylene oxide: 50) | 1 | | | |
| RHEODOL TW-L120 (HLB 16.7) | | | | |
| OLFINE E1010 (HLB 14) | | 0.15 | 0.45 | 0.2 |
| EMULGEN 1108 (HLB 13.4) | | | | |
| NOIGEN ET-106A (HLB 10.9) | 0.25 | | | |
| NIKKOL PEN4612 (HLB 8.5) | | | | |
| Aqueous Dispersion (*) of Self-Dispersing Polymer | B-1 8 | B-1 8 | B-1 8 | B-1 8 |
| Carnauba Wax | | | | |
| Paraffin Wax | | | | 1 |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | |
| Ion Exchanged Water | Remainder | Remainder | Remainder | Remainder |
| Remarks | Invention | Invention | Invention | Inventio |

| | Ink No./Pigment Dispersion | | | |
|---|---|---|---|---|
| Ink Composition | 13 Cyan | 14 Cyan | 15 Cyan | 16 Cyan |

| | | | | |
|---|---|---|---|---|
| Pigment (*) | 2.5 | 2.5 | 2.5 | 2.5 |
| Dispersant | 1.1 | 1.1 | 1.1 | 1.1 |
| SANNIX GP250 (manufactured by Sanyo Chemical Industries, Ltd.) SP value: 26.4 | 10 | 10 | 10 | 10 |
| Triethylene Glycol Monomethyl Ether SP value: 20.4 | 3 | 3 | 2 | 2 |
| Dipropylene Glycol SP value: 27.2 | 5 | 5 | 2 | 2 |
| Glycerin SP value: 33.5 | | | | |
| Diethylene Glycol SP value: 30.6 | | | | |
| 2-Pyrrolidone SP value: 27.2 | | | 2 | 2 |
| PVP, PVA or PEG — PVP K15 (PVP, Mw = 8000 to 10000) | | 0.05 | 0.05 | 0.05 |
| PEG 20000 (PEG, Mw = 20000) | 0.05 | | | |
| PVA-205 | | | | |
| Urea | 5 | 5 | 5 | 5 |
| OLFINE E1020 (HLB 15.2) | 1 | 1 | 1 | 1 |
| SURFYNOL 485 (HLB 17) | | | | |
| Ethylene Oxide Adduct of 2,4,7,9-Tetramethyl-5-decyne-4,7-diol (HLB 19) (addition mole number of ethylene oxide: 50) | | | | |
| RHEODOL TW-L120 (HLB 16.7) | | | | |
| OLFINE E1010 (HLB 14) | 0.2 | 0.2 | 0.2 | 0.2 |
| EMULGEN 1108 (HLB 13.4) | | | | |
| NOIGEN ET-106A (HLB 10.9) | | | | |
| NIKKOL PEN4612 (HLB 8.5) | | | | |
| Aqueous Dispersion (*) of Self-Dispersing Polymer | B-1 8 | B-1 8 | B-1 8 | B-6 8 |
| Carnauba Wax | | 2 | 2 | 2 |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | 0.01 |
| Ion Exchanged Water | Remainder | Remainder | Remainder | Remainder |
| Remarks | Invention | Invention | Invention | Inventio |

| | Ink No./Pigment Dispersion | | | |
|---|---|---|---|---|
| Ink Composition | 17 Cyan | 18 Magenta | 19 Magenta | 20 Magenta |

| | | | | |
|---|---|---|---|---|
| Pigment (*) | 2.5 | 5. | 5 | 5 |
| Dispersant | 1.1 | 1.1 | 1.1 | 1.1 |
| SANNIX GP250 (manufactured by Sanyo Chemical Industries, Ltd.) SP value: 26.4 | 10 | 10 | 10 | 10 |
| Triethylene Glycol Monomethyl Ether SP value: 20.4 | 2 | 2 | 2 | 2 |

TABLE 1-continued

| Ink Composition | | | | |
|---|---|---|---|---|
| Dipropylene Glycol SP value: 27.2 | 2 | 3 | 3 | 3 |
| Glycerin SP value: 33.5 | | | | |
| Diethylene Glycol SP value: 30.6 | | | | |
| 2-Pyrrolidone SP value: 27.2 | 2 | 2 | 2 | 2 |
| PVP, PVP K15 (PVP, Mw = 8000 to 10000) | 0.05 | 0.05 | 0.13 | 0.08 |
| PVA or PEG 20000 (PEG, Mw = 20000) | | | | |
| PVA-205 | | | | |
| Urea | 5 | 5 | 5 | 5 |
| OLFINE E1020 (HLB 15.2) | 0.5 | 1 | 1 | 1 |
| SURFYNOL 485 (HLB 17) | | | | |
| Ethylene Oxide Adduct of 2,4,7,9-Tetramethyl-5-decyne-4,7-diol (HLB 19) (addition mole number of ethylene oxide: 50) | | | | |
| RHEODOL TW-L120 (HLB 16.7) | | | | |
| OLFINE E1010 (HLB 14) | 0.65 | 0.2 | 0.2 | 0.2 |
| EMULGEN 1108 (HLB 13.4) | | | | |
| NOIGEN ET-106A (HLB 10.9) | | | | |
| NIKKOL PEN4612 (HLB 8.5) | | | | |
| Aqueous Dispersion (*) of Self-Dispersing Polymer | B-1 8 | B-6 7 | B-1 7 | B-3 4.5 |
| Carnauba Wax | 2 | 2 | 2 | 2 |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | |
| Ion Exchanged Water | Remainder | Remainder | Remainder | Remainder |
| Remarks | Invention | Invention | Invention | Inventio |

| | Ink No./Pigment Dispersion | | | |
|---|---|---|---|---|
| Ink Composition | 21 Yellow | 22 Yellow | 23 Black | 24 Cyan |
| Pigment (*) | 4 | 4 | 3 | 2.5 |
| Dispersant | 1.7 | 1.7 | 1.5 | 1.1 |
| SANNIX GP250 (manufactured by Sanyo Chemical Industries, Ltd.) SP value: 26.4 | 10 | 10 | 10 | 10 |
| Triethylene Glycol Monomethyl Ether SP value: 20.4 | 2 | 2 | 2 | 3 |
| Dipropylene Glycol SP value: 27.2 | 3 | 3 | 3 | 5 |
| Glycerin SP value: 33.5 | | | | |
| Diethylene Glycol SP value: 30.6 | | | | |
| 2-Pyrrolidone SP value: 27.2 | 2 | 2 | | 2 |
| PVP, PVP K15 (PVP, Mw = 8000 to 10000) | 0.05 | | 0.05 | 0.05 |
| PVA or PEG 20000 (PEG, Mw = 20000) | | | 0.05 | |
| PVA-205 | | | | |
| Urea | 5 | 5 | 5 | 5 |
| OLFINE E1020 (HLB 15.2) | 1 | 1 | 1 | 0.5 |
| SURFYNOL 485 (HLB 17) | | | | |
| Ethylene Oxide Adduct of 2,4,7,9-Tetramethyl-5-decyne-4,7-diol (HLB 19) (addition mole number of ethylene oxide: 50) | | | | |
| RHEODOL TW-L120 (HLB 16.7) | | | | |
| OLFINE E1010 (HLB 14) | 0.2 | 0.2 | 0.2 | 0.65 |
| EMULGEN 1108 (HLB 13.4) | | | | |
| NOIGEN ET-106A (HLB 10.9) | | | | |
| NIKKOL PEN4612 (HLB 8.5) | | | | |
| Aqueous Dispersion (*) of Self-Dispersing Polymer | B-3 7 | B-3 7 | B-1 8 | B-1 8 |
| Carnauba Wax | 2 | 2 | 2 | 2 |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | 0.01 | | | |
| Antifoaming Agent (BYK-24) (manufactured by Big Chemie Japan Co.) | | | | |
| Ion Exchanged Water | Remainder | Remainder | Remainder | Remainder |
| Remarks | Invention | Invention | Invention | Inventio |

TABLE 1-continued

| Ink Composition | 25 Cyan | 26 Cyan | 27 Cyan | 28 Cyan |
|---|---|---|---|---|
| Pigment (*) | 3 | 3 | 3 | 2.5 |
| Dispersant | 1.3 | 1.3 | 1.3 | 1.1 |
| SANNIX GP250 (manufactured by Sanyo Chemical Industries, Ltd.) SP value: 26.4 | 10 | | 8 | 10 |
| Triethylene Glycol Monomethyl Ether SP value: 20.4 | 3 | 8 | | 3 |
| Dipropylene Glycol SP value: 27.2 | 5 | | | 5 |
| Glycerin SP value: 33.5 | | 8 | | |
| Diethylene Glycol SP value: 30.6 | | | 8 | |
| 2-Pyrrolidone SP value: 27.2 | | | | |
| PVP, PVA or PEG — PVP K15 (PVP, Mw = 8000 to 10000) | 0.05 | 0.05 | 0.05 | 0.05 |
| PEG 20000 (PEG, Mw = 20000) | | | | |
| PVA-205 | | | | |
| Urea | 5 | 5 | 5 | 5 |
| OLFINE E1020 (HLB 15.2) | 1 | 1 | 1 | |
| SURFYNOL 485 (HLB 17) | | | | |
| Ethylene Oxide Adduct of 2,4,7,9-Tetramethyl-5-decyne-4,7-diol (HLB 19) (addition mole number of ethylene oxide: 50) | | | | |
| RHEODOL TW-L120 (HLB 16.7) | | | | 1 |
| OLFINE E1010 (HLB 14) | 0.2 | 0.2 | 0.2 | 0.2 |
| EMULGEN 1108 (HLB 13.4) | | | | |
| NOIGEN ET-106A (HLB 10.9) | | | | |
| NIKKOL PEN4612 (HLB 8.5) | | | | |
| Aqueous Dispersion (*) of Self-Dispersing Polymer | B-1 5.5 | B-1 6.4 | B-1 7 | B-1 8 |
| Carnauba Wax | 2 | 2 | 2 | 2 |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | |
| Ion Exchanged Water | Remainder | Remainder | Remainder | Remainder |
| Remarks | Invention | Invention | Invention | Inventio |

| Ink Composition | 29 Cyan | 30 Black2 | 31 Cyan |
|---|---|---|---|
| Pigment (*) | 2.5 | 2.69 | 2.5 |
| Dispersant | 1.1 | 1.1 | 1.1 |
| SANNIX GP250 (manufactured by Sanyo Chemical Industries, Ltd.) SP value: 26.4 | 10 | 10 | 10 |
| Triethylene Glycol Monomethyl Ether SP value: 20.4 | 3 | 3 | 3 |
| Dipropylene Glycol SP value: 27.2 | 5 | 5 | 5 |
| Glycerin SP value: 33.5 | | | |
| Diethylene Glycol SP value: 30.6 | | | |
| 2-Pyrrolidone SP value: 27.2 | | | 2 |
| PVP, PVA or PEG — PVP K15 (PVP, Mw = 8000 to 10000) | | 0.05 | 0.05 |
| PEG 20000 (PEG, Mw = 20000) | | | |
| PVA-205 | 0.05 | | |
| Urea | 5 | 5 | 5 |
| OLFINE E1020 (HLB 15.2) | 1 | 1 | 1 |
| SURFYNOL 485 (HLB 17) | | | |
| Ethylene Oxide Adduct of 2,4,7,9-Tetramethyl-5-decyne-4,7-diol (HLB 19) (addition mole number of ethylene oxide: 50) | | | |
| RHEODOL TW-L120 (HLB 16.7) | | | |
| OLFINE E1010 (HLB 14) | 0.2 | 0.2 | 0.2 |
| EMULGEN 1108 (HLB 13.4) | | | |
| NOIGEN ET-106A (HLB 10.9) | | | |
| NIKKOL PEN4612 (HLB 8.5) | | | |
| Aqueous Dispersion (*) of Self-Dispersing Polymer | B-1 8 | B-6 8 | B-5 8 |
| Carnauba Wax | 2 | 2 | 2 |
| Paraffin Wax | | | |

TABLE 1-continued

|  | | | |
|---|---|---|---|
| PROXEL XL2 | 0.3 | 0.3 | 0.3 |
| Antifoaming Agent (BYK-94) (manufactured by Big Chemie Japan Co.) | | | |
| Antifoaming Agent (BYK-24) (manufactured by Big Chemie Japan Co.) | | | |
| Ion Exchanged Water | Remainder | Remainder | Remainder |
| Remarks | Invention | Invention | Invention |

Unit of numeric values: proportion relative to the total mass of the composition [% by mass]

(*) solids content

TABLE 2

| | | Ink No./Pigment Dispersion | | | |
|---|---|---|---|---|---|
| Ink Composition | | 32 Cyan | 33 Cyan | 34 Magenta | 35 Yellow |
| Pigment (*) | | 2.5 | 2.5 | 5 | 4 |
| Dispersant | | 1.1 | 1.1 | 1.1 | 1.7 |
| SANNIX GP250 (manufactured by Sanyo Chemical Industries, Ltd.) SP value: 26.4 | | 10 | 10 | 10 | 10 |
| Triethylene Glycol Monomethyl Ether SP value: 20.4 | | 3 | 3 | 2 | 2 |
| Dipropylene Glycol SP value: 27.2 | | 5 | 5 | 3 | 3 |
| Glycerin SP value: 33.5 | | | | | |
| Diethylene Glycol SP value: 30.6 | | | | | |
| 2-Pyrrolidone SP value: 27.2 | | | | | |
| PVP, PVA or PEG | PVP K15 (PVP, Mw = 8000 to 10000) PEG 20000 (PEG, Mw = 20000) PVA-205 | 0.05 | 0.05 | 0.05 | 0.05 |
| Urea | | 5 | 5 | 5 | 5 |
| OLFINE E1020 (HLB 15.2) | | — | 1.5 | — | — |
| SURFYNOL 485 (HLB 17) | | — | — | — | — |
| Ethylene Oxide Adduct of 2,4,7,9-Tetramethyl-5-decyne-4,7-diol (HLB 19) (addition mole number of ethylene oxide: 50) | | — | — | — | — |
| RHEODOL TW-L120 (HLB 16.7) | | — | — | — | — |
| OLFINE E1010 (HLB 14) | | 1 | — | 1 | 1 |
| EMULGEN 1108 (HLB 13.4) | | | — | | |
| NOIGEN ET-106A (HLB 10.9) | | | — | | |
| NIKKOL PEN4612 (HLB 8.5) | | | — | | |
| Aqueous Dispersion (*) of Self-Dispersing Polymer | | B-1 8 | B-1 8 | B-1 7 | B-1 7 |
| Carnauba Wax | | 2 | 2 | 2 | 2 |
| Paraffin Wax | | | | | |
| PROXEL XL2 | | 0.3 | 0.3 | 0.3 | 0.3 |
| Antifoaming Agent (BYK-94) (manufactured by Big Chemie Japan Co.) | | | | | |
| Antifoaming Agent (BYK-24) (manufactured by Big Chemie Japan Co.) | | | | | |
| Ion Exchanged Water | | Remainder | Remainder | Remainder | Remainder |
| Remarks | | Comparative | Comparative | Comparative | Comparative |

| | | Ink No./Pigment Dispersion | | | |
|---|---|---|---|---|---|
| Ink Composition | | 36 Black | 37 Cyan | 38 Cyan | 39 Cyan |
| Pigment (*) | | 3 | 2.5 | 2.5 | 2.5 |
| Dispersant | | 1.5 | 1.1 | 1.1 | 1.1 |
| SANNIX GP250 (manufactured by Sanyo Chemical Industries, Ltd.) SP value: 26.4 | | 10 | 10 | 10 | 10 |
| Triethylene Glycol Monomethyl Ether SP value: 20.4 | | 2 | 3 | 3 | 3 |
| Dipropylene Glycol SP value: 27.2 | | 3 | 5 | 5 | 5 |
| Glycerin SP value: 33.5 | | | | | |
| Diethylene Glycol SP value: 30.6 | | | | | |
| 2-Pyrrolidone SP value: 27.2 | | | | | |
| PVP, PVA or PEG | PVP K15 (PVP, Mw = 8000 to 10000) PEG 20000 (PEG, Mw = 20000) PVA-205 | 0.05 | 0.05 | 0.05 | 0.05 |

TABLE 2-continued

| | | | | |
|---|---|---|---|---|
| Urea | 5 | 5 | 5 | 5 |
| OLFINE E1020 (HLB 15.2) | — | — | 1 | 1 |
| SURFYNOL 485 (HLB 17) | — | — | | |
| Ethylene Oxide Adduct of 2,4,7,9-Tetramethyl-5-decyne-4,7-diol (HLB 19) (addition mole number of ethylene oxide: 50) | — | — | | |
| RHEODOL TW-L120 (HLB 16.7) | — | — | | |
| OLFINE E1010 (HLB 14) | 1 | 0.25 | — | |
| EMULGEN 1108 (HLB 13.4) | | | — | |
| NOIGEN ET-106A (HLB 10.9) | | | — | |
| NIKKOL PEN4612 (HLB 8.5) | | | — | 0.5 |
| Aqueous Dispersion (*) of Self-Dispersing Polymer | B-1 7 | B-1 8 | B-1 8 | B-1 8 |
| Carnauba Wax | 2 | 2 | 2 | 2 |
| Paraffin Wax | | | | |
| PROXEL XL2 | 0.3 | 0.3 | 0.3 | 0.3 |
| Antifoaming Agent (BYK-94) (manufactured by Big Chemie Japan Co.) | | | | |
| Antifoaming Agent (BYK-24) (manufactured by Big Chemie Japan Co.) | | | | |
| Ion Exchanged Water | Remainder | Remainder | Remainder | Remainder |
| Remarks | Comparative | Comparative | Comparative | Comparative |

Unit of numeric values: proportion relative to the total mass of the composition [% by mass]

(*) solids content

TABLE 3

| | Ink No. | | | | | | | |
|---|---|---|---|---|---|---|---|---|
| Ink Composition | 1 Cyan | 2 Cyan | 3 Cyan | 4 Cyan | 5 Cyan | 6 Cyan | 7 Cyan | 8 Cyan |
| Total solid content [% by mass] (pigment + dispersant + self-dispersing polymer) | 11.6 | 10.6 | 11.6 | 11.6 | 11.6 | 11.6 | 10.6 | 11.6 |
| Ratio of self-dispersing polymer to the whole solids [% by mass] | 69.0 | 59.3 | 69.0 | 69.0 | 69.0 | 69.0 | 59.3 | 69.0 |
| Tg of self-dispersing polymer [° C.] | 180 | 180 | 180 | 130 | 100 | 86 | 180 | 180 |
| Amount of solvent [% by mass; relative to the total mass of the composition] | 16 | 16 | 12 | 18 | 18 | 18 | 16 | 16 |
| Ratio (a)/(b) | 4 | 4 | 4 | 4 | 4 | 4 | 2.86 | 4 |
| Remarks | Invention | Invention | Invention | Invention | Invention | Invention | Invention | Invention |

| | Ink No. | | | | | | | |
|---|---|---|---|---|---|---|---|---|
| Ink Composition | 9 Cyan | 10 Cyan | 11 Cyan | 12 Cyan | 13 Cyan | 14 Cyan | 15 Cyan | 16 Cyan |
| Total solid content [% by mass] (pigment + dispersant + self-dispersing polymer) | 11.6 | 11.6 | 11.6 | 11.6 | 11.6 | 11.6 | 11.6 | 11.6 |
| Ratio of self-dispersing polymer to the whole solids [% by mass] | 69.0 | 69.0 | 69.0 | 69.0 | 69.0 | 69.0 | 69.0 | 69.0 |
| Tg of self-dispersing polymer [° C.] | 180 | 180 | 180 | 180 | 180 | 180 | 180 | 157 |
| Amount of solvent [% by mass; relative to the total mass of the composition] | 18 | 18 | 18 | 18 | 18 | 18 | 16 | 16 |
| Ratio (a)/(b) | 4 | 8.3 | 2.2 | 5.0 | 5.0 | 5.0 | 5.0 | 5.0 |
| Remarks | Invention | Invention | Invention | Invention | Invention | Invention | Invention | Invention |

| | Ink No. | | | | | | | |
|---|---|---|---|---|---|---|---|---|
| Ink Composition | 17 Cyan | 18 Magenta | 19 Magenta | 20 Magenta | 21 Yellow | 22 Yellow | 23 Black | 24 Cyan |
| Total solid content [% by mass] (pigment + dispersant + self-dispersing polymer) | 11.6 | 13.1 | 13.1 | 10.6 | 12.7 | 12.7 | 12.5 | 11.6 |
| Ratio of self-dispersing polymer to the whole solids [% by mass] | 69.0 | 53.4 | 53.4 | 42.4 | 55.1 | 55.1 | 63.9 | 69.0 |
| Tg of self-dispersing polymer [° C.] | 180 | 157 | 180 | 100 | 100 | 100 | 180 | 180 |
| Amount of solvent [% by mass; relative to the total mass of the composition] | 16 | 17 | 17 | 17 | 17 | 17 | 17 | 18 |
| Ratio (a)/(b) | 0.8 | 5.0 | 5.0 | 5.0 | 5.0 | 5.0 | 5.0 | 0.8 |
| Remarks | Invention | Invention | Invention | Invention | Invention | Invention | Invention | Invention |

TABLE 3-continued

|  | Ink No. | | | | | | |
|---|---|---|---|---|---|---|---|
| Ink Composition | 25 Cyan | 26 Cyan | 27 Cyan | 28 Cyan | 29 Cyan | 30 Black 2 | 31 Cyan |
| Total solid content [% by mass] (pigment + dispersant + self-dispersing polymer) | 9.8 | 10.7 | 11.3 | 11.6 | 11.6 | 11.8 | 11.6 |
| Ratio of self-dispersing polymer to the whole solids [% by mass] | 56.0 | 59.7 | 61.8 | 69.0 | 69.0 | 67.7 | 69.0 |
| Tg of self-dispersing polymer [° C.] | 180 | 180 | 180 | 180 | 180 | 157 | 71 |
| Amount of solvent [% by mass; relative to the total mass of the composition] | 18 | 16 | 16 | 18 | 18 | 20 | 18 |
| Ratio (a)/(b) | 5.0 | 5.0 | 5.0 | 5.0 | 5.0 | 5.0 | 5 |
| Remarks | Invention | Invention | Invention | Invention | Invention | Invention | Invention |

OLFINE E1020 (HLB 15.2): trade name, manufactured by Nissin Chemical Industry Co.; ethylene oxide adduct of 2,4,7,9-tetramethyl-5-decyne-4,7-diol (addition mole number of ethylene oxide: 20)

SURFYNOL 485 (HLB 17): trade name, manufactured by Air Products and Chemicals, Inc.; ethylene oxide adduct of 2,4,7,9-tetramethyl-5-decyne-4,7-diol (addition mole number of ethylene oxide: 30)

OLFINE E1010 (HLB 14): trade name, manufactured by Nissin Chemical Industry Co.; ethylene oxide adduct of 2,4,7,9-tetramethyl-5-decyne-4,7-diol (addition mole number of ethylene oxide: 10)

EMULGEN 1108 (HLB 13.4): trade name, manufactured by Kao Corporation; $RO(C_2H_4O)wH$ (R: an alkyl group having 11 carbon atoms, and w=8)

NOIGEN ET-106A (HLB 10.9): trade name, manufactured by DAI-ICHI KOGYO SEIYAKU CO., LTD.; $RO(C_2H_4O)w(C_3H_6O)xH$ (R: an alkyl group having 12 or 14 carbon atoms, w=5, and x=3.5)

RHEODOL TW-L120 (HLB 16.7): trade name, manufactured by Kao Corporation; polyoxyethylene sorbitan monolaurate)

NIKKOL PEN4612 (HLB 8.5): trade name, manufactured by NIKKO CHEMICALS CO., LTD.; $C_{24}H_{49}O(C_3H_6O)_6(C_2H_4O)_{12}H$ Carnauba wax: SELOSOL 524 (trade name), manufactured by CHUKYO YUSHI CO, LTD.

Paraffin wax: SELOSOL 428 (trade name), manufactured by CHUKYO YUSHI CO, LTD.

PROXEL XL2: trade name, manufactured by AVECIA Inc.; 1,2-benzisothiazolin-3-one

PVP K15: trade name, manufactured by Wako Pure Chemical Industries, Ltd.; polyvinyl pyrrolidone PEG 20000: trade name, manufactured by Wako Pure Chemical Industries, Ltd.; polyethylene glycol PVA-205: trade name, manufactured by Kuraray Co., Ltd.; polyvinyl alcohol

TABLE 4

|  | Ink No. | | | | | | | |
|---|---|---|---|---|---|---|---|---|
| Ink Composition | 32 Cyan | 33 Cyan | 34 Magenta | 35 Yellow | 36 Black | 37 Cyan | 38 Cyan | 39 Cyan |
| Total solid content [% by mass] (pigment + dispersant + self-dispersing polymer) | 11.6 | 11.6 | 13.1 | 12.7 | 11.5 | 11.6 | 11.6 | 11.6 |
| Ratio of self-dispersing polymer to the whole solids [% by mass] | 69.0 | 69.0 | 53.4 | 55.1 | 60.8 | 69.0 | 69.0 | 69.0 |
| Tg of self-dispersing polymer [° C.] | 180 | 180 | 180 | 180 | 180 | 180 | 180 | 180 |
| Amount of solvent [% by mass; relative to the total mass of the composition] | 18 | 18 | 15 | 15 | 15 | 18 | 18 | 18 |
| Ratio (a)/(b) | — | — | — | — | — | — | — | 2 |
| Remarks | Comparative | Comparative | Comparative | Comparative | Comparative | Comparative | Comparative | Comparative |

TABLE 5

|  |  | Ink No. | | | | | | | |
|---|---|---|---|---|---|---|---|---|---|
|  |  | 1 Cyan | 2 Cyan | 3 Cyan | 4 Cyan | 5 Cyan | 6 Cyan | 7 Cyan | 8 Cyan |
| Evaluation (1) | Offset resistance | 5 | 4 | 4 | 4 | 3 | 3 | 3 | 5 |
|  | Blocking resistance | 5 | 4 | 4 | 4 | 4 | 3 | 3 | 5 |
|  | Scratch resistance | 5 | 5 | 4 | 4 | 4 | 4 | 4 | 5 |
| Evaluation (2) | Matte coat paper scratch resistance (Color transfer resistance) | 4 | 4 | 4 | 3 | 3 | 3 | 3 | 4 |

TABLE 5-continued

| | | | | | | | | | |
|---|---|---|---|---|---|---|---|---|---|
| | Dot diameter change of secondary color ink after thermo-aging (Thermo-aging condition 1) | 4 | 4 | 4 | 4 | 4 | 4 | 4 | 4 |
| | Dot diameter change of secondary color ink after thermo-aging (Thermo-aging condition 2) | 4 | 4 | 4 | 4 | 4 | 4 | 3 | 4 |
| | Curling Property | 4 | 4 | 4 | 4 | 4 | 4 | 3 | 4 |
| | Continuous ejection property | 3 | 3 | 3 | 3 | 3 | 3 | 3 | 3 |
| | Regions missing image after leaving | 3 | 3 | 3 | 3 | 3 | 3 | 3 | 3 |
| | Ejection deviation after leaving | 3 | 3 | 3 | 3 | 3 | 3 | 3 | 3 |
| | Note | Invention | Invention | Invention | Invention | Invention | Invention | Invention | Invention |

| | | Ink No. | | | | | | | |
|---|---|---|---|---|---|---|---|---|---|
| | | 9 Cyan | 10 Cyan | 11 Cyan | 12 Cyan | 13 Cyan | 14 Cyan | 15 Cyan | 16 Cyan |
| Evaluation (1) | Offset resistance | 5 | 5 | 5 | 5 | 5 | 5 | 5 | 5 |
| | Blocking resistance | 5 | 4 | 5 | 5 | 5 | 5 | 5 | 5 |
| | Scratch resistance | 5 | 5 | 5 | 5 | 5 | 5 | 5 | 5 |
| Evaluation (2) | Matte coat paper scratch resistance (Color transfer resistance) | 4 | 4 | 4 | 5 | 4 | 5 | 5 | 5 |
| | Dot diameter change of secondary color ink after thermo-aging (Thermo-aging condition 1) | 3 | 3 | 3 | 4 | 4 | 4 | 4 | 5 |
| | Dot diameter change of secondary color ink after thermo-aging (Thermo-aging condition 2) | 3 | 3 | 3 | 4 | 4 | 4 | 4 | 4 |
| | Curling Property | 4 | 4 | 4 | 4 | 4 | 4 | 5 | 5 |
| | Continuous ejection property | 3 | 3 | 3 | 3 | 5 | 5 | 5 | 5 |
| | Regions missing image after leaving | 3 | 3 | 3 | 3 | 5 | 5 | 5 | 5 |
| | Ejection deviation after leaving | 3 | 3 | 3 | 3 | 5 | 5 | 5 | 5 |
| | Note | Invention | Invention | Invention | Invention | Invention | Invention | Invention | Invention |

| | | Ink No. | | | | | | | |
|---|---|---|---|---|---|---|---|---|---|
| | | 17 Cyan | 18 Magenta | 19 Magenta | 20 Magenta | 21 Yellow | 22 Yellow | 23 Black | 24 Cyan |
| Evaluation (1) | Offset resistance | 5 | 5 | 5 | 3 | 5 | 5 | 5 | 4 |
| | Blocking resistance | 5 | 5 | 5 | 3 | 5 | 5 | 5 | 4 |
| | Scratch resistance | 5 | 5 | 5 | 4 | 5 | 5 | 5 | 4 |
| Evaluation (2) | Matte coat paper scratch resistance (Color transfer resistance) | 5 | 5 | 5 | 4 | 5 | 5 | 5 | 4 |
| | Dot diameter change of secondary color ink after thermo-aging (Thermo-aging condition 1) | 4 | — | — | — | 5 | 5 | 5 | 3 |
| | Dot diameter change of secondary color ink after thermo-aging (Thermo-aging condition 2) | 3 | — | — | — | 5 | 5 | 5 | 3 |
| | Curling Property | 5 | 5 | 5 | 5 | 5 | 5 | 5 | 4 |
| | Continuous ejection property | 3 | 5 | 4 | 5 | 5 | 4 | 5 | 3 |
| | Regions missing image after leaving | 3 | 5 | 3 | 5 | 5 | 3 | 5 | 3 |
| | Ejection deviation after leaving | 3 | 5 | 3 | 5 | 5 | 3 | 5 | 3 |
| | Note | Invention | Invention | Invention | Invention | Invention | Invention | Invention | Invention |

| | | Ink No. | | | | | | |
|---|---|---|---|---|---|---|---|---|
| | | 25 Cyan | 26 Cyan | 27 Cyan | 28 Cyan | 29 Cyan | 30 Black 2 | 31 Cyan |
| Evaluation (1) | Offset resistance | 3 | 3 | 3 | 5 | 5 | 5 | 2 |
| | Blocking resistance | 3 | 3 | 3 | 5 | 5 | 5 | 2 |
| | Scratch resistance | 3 | 3 | 4 | 5 | 5 | 5 | 2 |

TABLE 5-continued

| Evaluation (2) | Matte coat paper scratch resistance (Color transfer resistance) | 3 | 3 | 3 | 5 | 5 | 5 | 2 |
|---|---|---|---|---|---|---|---|---|
| | Dot diameter change of secondary color ink after thermo-aging (Thermo-aging condition 1) | 4 | 4 | 4 | 4 | 4 | 5 | 4 |
| | Dot diameter change of secondary color ink after thermo-aging (Thermo-aging condition 2) | 4 | 4 | 4 | 4 | 4 | 5 | 4 |
| | Curling Property | 4 | 3 | 3 | 4 | 4 | 5 | 4 |
| | Continuous ejection property | 4 | 4 | 4 | 3 | 3 | 5 | 3 |
| | Regions missing image after leaving | 4 | 4 | 4 | 4 | 4 | 5 | 4 |
| | Ejection deviation after leaving | 4 | 3 | 3 | 4 | 4 | 5 | 4 |
| | Note | Invention | Invention | Invention | Invention | Invention | Invention | Invention |

TABLE 6

| | | Ink No. | | | | | | | |
|---|---|---|---|---|---|---|---|---|---|
| | | 32 Cyan | 33 Cyan | 34 Magenta | 35 Yellow | 36 Black | 37 Cyan | 38 Cyan | 39 Cyan |
| Evaluation (1) | Offset resistance | 4 | 1 | 4 | 4 | 4 | 2 | 2 | 2 |
| | Blocking resistance | 4 | 2 | 4 | 4 | 4 | 2 | 2 | 2 |
| | Scratch resistance | 4 | 4 | 4 | 4 | 4 | 4 | 4 | 4 |
| Evaluation (2) | Matte coat paper scratch resistance (Color transfer resistance) | 4 | 4 | 4 | 4 | 4 | 4 | 4 | 4 |
| | Dot diameter change of secondary color ink after thermo-aging (Thermo-aging condition 1) | 1 | 4 | — | 1 | 1 | 3 | 4 | 2 |
| | Dot diameter change of secondary color ink after thermo-aging (Thermo-aging condition 2) | 1 | 3 | — | 1 | 1 | 3 | 4 | 2 |
| | Curling Property | 4 | 4 | 4 | 4 | 4 | 4 | 4 | 4 |
| | Continuous ejection property | 4 | 1 | 4 | 4 | 4 | 2 | 2 | 2 |
| | Regions missing image after leaving | 4 | 1 | 4 | 4 | 4 | 4 | 4 | 4 |
| | Ejection deviation after leaving | 4 | 1 | 4 | 4 | 4 | 2 | 2 | 2 |
| | Note | Comparative | Comparative | Comparative | Comparative | Comparative | Comparative | Comparative | Comparative |

As shown in Table 5 and Table 6 above, in the Examples, the ink ejection was satisfactory, and the change in size (reduction in diameter) of the ink droplets spotted on the recording medium was suppressed, and the occurrence of white spot defect in the image or the like was not observed.

—Evaluation 3—

(Color Reproduction Region)

Using the ink-jet recording apparatus used in the above image recording (2), on a recording medium (trade name: "OK TOPCOAT PLUS", manufactured by Oji Paper Co., Ltd.), a 100% duty image was formed using an ink set (hereinafter, referred to as "ink set A") including the above ink 16 (cyan), ink 18 (magenta), and ink 21 (yellow), and another 100% duty image was formed using an ink set (hereinafter, referred to as "ink set B") including the ink 32 (cyan), ink 34 (magenta), and ink 35 (yellow), to obtain images.

Here, the term "duty" is defined by the following Equation (X), and indicates the unit of the value D to be calculated. The term "100% duty" means the maximum mass of monochromatic ink with respect to an element.

$$D(duty)=(\text{Practically printed dot number}/(\text{Longitudinal resolution} \times \text{Transverse resolution})) \times 100 \quad \text{Equation (X)}$$

The optical density (OD) of each of the images thus obtained was measured using SPM-50 (trade name), manufactured by Gretag-Macbeth with a light source of D65 and at an viewing angle of 2°, and for each image, the L* value, a* value, and b* value, which are defined in CIE L*a*b* color space, were determined.

Color for evaluation: monochrome of 100% duty formed with an ink of one color selected from yellow ink, magenta ink, and cyan ink; and mixed color of 100% duty formed with inks of two colors, each of 50% duty, the inks of two colors being selected from yellow ink, magenta ink, and cyan ink.

Further, the same evaluation was conducted using the ink set including the inks after thermo-aging, which were obtained in the above evaluation of "dot diameter change".

A graph was drawn by the a* value and the b* value of the color for evaluation in the above image, and the area of a region including the original point in the graph was determined, and the area was designated as the saturation area.

With regard to the thus evaluated saturation area, the change in the saturation area between before and after thermo-aging was calculated as the rate of change, in accordance with to the following equation. The results of calculation are shown in Table 7 below.

Rate (%) of change in color reproduction after thermo-aging=Saturation area after thermo-aging/Saturation area before thermo-aging×100

TABLE 7

|  | Ink Set A | Ink Set B |
|---|---|---|
| Rate of change in color reproduction after thermo-aging (%) (Thermo-aging condition 1) | 99% | 90% |
| Rate of change in color reproduction after thermo-aging (%) (Thermo-aging condition 2) | 96% | 84% |

As is evident from Table 7 above, in the case of using the ink of the invention (Ink Set A), even if the ink is stored under a high temperature environment higher than room temperature, the change in color reproduction region can be suppressed to a low level.

Further, it was found that with regard to the sample which was printed using the ink set B that had been subjected to thermo-aging, streaks in the image were remarkably seen, and thus, deterioration in image quality had occurred.

According to the present invention, it is possible to provide an ink composition which has favorable ink ejection property and with which the reduction in the liquid droplet diameter (dot diameter) of the spotted ink is suppressed to realize excellent image quality and excellent color reproducibility, an ink set, and an image forming method.

Exemplary embodiments of the invention include, but are not limited to, the following.

<1> An ink composition comprising:
a pigment,
self-dispersing resin particles including a hydrophilic constituent unit and a hydrophobic constituent unit,
at least two nonionic surfactants including (a) a nonionic surfactant having an HLB of from 15 to 19 and (b) a nonionic surfactant having an HLB of from 10 to less than 15,
a water-soluble organic solvent, and
water.

<2> The ink composition according to <1>, wherein the ink composition comprises, as the at least two nonionic surfactants, at least two ethylene oxide adducts of acetylene glycol represented by the following Formula (1) including (a) a nonionic surfactant having an HLB of from 15 to 19 and (b) a nonionic surfactant having an HLB of from 10 to less than 15:

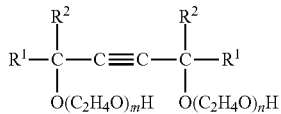

Formula (1)

wherein in Formula (1), each of $R^1$ and $R^2$ independently represents an alkyl group having from 1 to 5 carbon atoms; each of m and n independently represents a positive number of from 0.5 to 25; and m and n satisfy $m+n \geq 1$.

<3> The ink composition according to <1> or <2>, wherein the self-dispersing resin particles include a constituent unit derived from an alicyclic monomer as the hydrophobic constituent unit.

<4> The ink composition according to any one of <1> to <3>, wherein a content of the self-dispersing resin particles is 40% by mass or higher relative to a total solid content of the ink composition.

<5> The ink composition according to any one of <1> to <4>, wherein a content ratio of (a) the nonionic surfactant having an HLB of from 15 to 19 relative to (b) the nonionic surfactant having an HLB of from 10 to less than 15 [(a)/(b); mass ratio] is from 10/1 to 1/1.

<6> The ink composition according to any one <1> to <5>, wherein a glass transition temperature of the self-dispersing resin particles is 80° C. or higher.

<7> The ink composition according to any one of <1> to <6>, wherein a total solid content of the ink composition is 10% by mass or higher relative to a total mass of the ink composition.

<8> The ink composition according to any one <1> to <7>, wherein a total content water-soluble organic solvent(s) is less than 20% by mass relative to a total mass of the ink composition, and a total content of water-soluble organic solvent(s) having an SP value of 27.5 or less is 70% by mass or higher relative to a total mass of water-soluble organic solvent(s).

<9> The ink composition according to any one of <1> to <8>, wherein a content of constituent unit(s) derived from an alicyclic monomer is from 50% by mass to 80% by mass relative to a total mass of constituent unit(s) of the self-dispersing resin particles.

<10> The ink composition according to any one of <1> to <9>, wherein the self-dispersing resin particles comprise a copolymer obtained by copolymerization of at least three monomers including at least one alicyclic(meth)acrylate, at least one (meth)acrylate containing a straight chain or branched alkyl group having from 1 to 8 carbon atoms, and at least one hydrophilic group-containing monomer.

<11> The ink composition according to any one of <1> to <10>, further comprising 2-pyrrolidone.

<12> The ink composition according to any one of <1> to <11>, further comprising poorly water-soluble wax particles selected from the group consisting of paraffin wax particles, paraffin wax derivative particles, carnauba wax particles, and mixtures thereof.

<13> The ink composition according to any one of <1> to <12>, further comprising at least one selected from the group consisting of polyvinyl pyrrolidone, polyvinyl alcohol and polyethylene glycol, in an amount of from 0.01% by mass to less than 1.00% by mass relative to a total mass of the ink composition.

<14> An ink set comprising:
the ink composition according to any one <1> to <13>; and
a treatment liquid including an aggregating component that causes formation of an aggregate in the ink composition as a result of contacting the ink composition.

<15> An image forming method comprising:
applying an ink composition onto a recording medium by ejecting the ink composition according to any one of <1> to <13> or the ink composition included in the ink set according to <14>, from an ejection head having a plurality of nozzle holes that discharge liquid droplets, by an ink jet method.

<16> The image forming method according to <15>, wherein, in the application of the ink composition, the ink jet method is a piezo ink-jet method.

<17> The image forming method according to <15> or <16>, further comprising applying, onto the recording medium, a treatment liquid including an aggregating component that causes formation of an aggregate in the ink composition as a result of contacting the ink composition.

<18> The image forming method according to <17>, further comprising heating and fixing, to the recording medium, an image formed through the application of the ink composition and the application of the treatment liquid.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
   a pigment,
   self-dispersing resin particles including a hydrophilic constituent unit and a hydrophobic constituent unit,
   at least two nonionic surfactants including (a) a nonionic surfactant having an HLB of from 15 to 19 and (b) a nonionic surfactant having an HLB of from 10 to less than 15,
   wherein a content ratio of (a) the nonionic surfactant having an HLB of from 15 to 19 relative to (b) the nonionic surfactant having an HLB of from 10 to less than 15 [(a)/(b); mass ratio] is from 10/1 to 10/6,
   one or more water-soluble organic solvents, and
   water.

2. The ink composition according to claim 1, wherein the ink composition comprises, as the at least two nonionic surfactants, at least two ethylene oxide adducts of acetylene glycol represented by the following Formula (1) including (a) a nonionic surfactant having an HLB of from 15 to 19 and (b) a nonionic surfactant having an HLB of from 10 to less than 15:

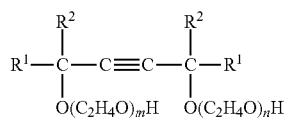

Formula (1)

wherein, in Formula (1), each of $R^1$ and $R^2$ independently represents an alkyl group having from 1 to 5 carbon atoms; each of m and n independently represents a positive number of from 0.5 to 25; and m and n satisfy m+n>1.

3. The ink composition according to claim 1, wherein the self-dispersing resin particles include a constituent unit derived from an alicyclic monomer as the hydrophobic constituent unit.

4. The ink composition according to claim 1, wherein a content of the self-dispersing resin particles is 40% by mass or higher relative to a total solid content of the ink composition.

5. The ink composition according to claim 1, wherein a content ratio of (a) the nonionic surfactant having an HLB of from 15 to 19 relative to (b) the nonionic surfactant having an HLB of from 10 to less than 15 [(a)/(b); mass ratio] is from 10/1 to 10/4.

6. The ink composition according to claim 1, wherein a glass transition temperature of the self-dispersing resin particles is 80° C. or higher.

7. The ink composition according to claim 1, wherein a total solid content of the ink composition is 10% by mass or higher relative to a total mass of the ink composition.

8. The ink composition according to claim 1, wherein a total content of the one or more water-soluble solvents is less than 20% by mass relative to a total mass of the ink composition, and a total content of the one or more water-soluble organic solvents having an SP value of 27.5 or less is 70% by mass or higher relative to a total mass of the one or more water-soluble organic solvents.

9. The ink composition according to claim 1, wherein a content of constituent units derived from an alicyclic monomer in the self-dispersing resin particles is from 50% by mass to 80% by mass relative to a total mass of constituent units of the self-dispersing resin particles.

10. The ink composition according to claim 1, wherein the self-dispersing resin particles comprise a copolymer obtained by copolymerization of at least three monomers including at least one alicyclic(meth)acrylate, at least one (meth)acrylate containing a straight chain or branched alkyl group having from 1 to 8 carbon atoms, and at least one hydrophilic group-containing monomer.

11. The ink composition according to claim 1, further comprising 2-pyrrolidone.

12. The ink composition according to claim 1, further comprising poorly water-soluble wax particles selected from the group consisting of paraffin wax particles, paraffin wax derivative particles, carnauba wax particles and mixtures thereof.

13. The ink composition according to claim 1, further comprising at least one selected from the group consisting of polyvinyl pyrrolidone, polyvinyl alcohol and polyethylene glycol, in an amount of from 0.01% by mass to less than 1.00% by mass relative to a total mass of the ink composition.

14. An ink set comprising:
    the ink composition according to claim 1; and
    a treatment liquid including an aggregating component that causes formation of an aggregate in the ink composition as a result of contacting the ink composition.

15. An image forming method comprising: applying an ink composition onto a recording medium by ejecting the ink composition according to claim 1, from an ejection head having a plurality of nozzle holes that discharge liquid droplets, by an ink jet method.

16. The image forming method according to claim 15, wherein, in the application of the ink composition, the ink jet method is a piezo ink-jet method.

17. The image forming method according to claim 15, further comprising applying, onto the recording medium, a treatment liquid including an aggregating component that causes formation of an aggregate in the ink composition as a result of contacting the ink composition.

18. The image forming method according to claim 17, further comprising heating and fixing, to the recording medium, an image formed through the application of the ink composition and the application of the treatment liquid.

19. The ink composition according to claim 1, further comprising at least one selected from the group consisting of polyvinyl pyrrolidone and polyvinyl alcohol, in an amount of from 0.01% by mass to less than 1.00% by mass relative to a total mass of the ink composition.

* * * * *